(12) United States Patent
Fujita et al.

(10) Patent No.: US 7,893,381 B2
(45) Date of Patent: Feb. 22, 2011

(54) WELDING SET OF METAL MEMBER INCLUDING PERMANENT MAGNET AND WELDING METHOD THEREOF, AS WELL AS ELECTRIC ROTATING MACHINE

(75) Inventors: Masahiko Fujita, Tokyo (JP); Shoichiro Nishitani, Tokyo (JP); Yasushi Nakatake, Tokyo (JP); Masaharu Doi, Tokyo (JP); Shinya Kudou, Tokyo (JP); Kazuhiro Shono, Tokyo (JP); Yoshihito Asao, Tokyo (JP); Masaru Kuribayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 988 days.

(21) Appl. No.: 10/555,643

(22) PCT Filed: Jan. 20, 2005

(86) PCT No.: PCT/JP2005/000693

§ 371 (c)(1),
(2), (4) Date: Nov. 4, 2005

(87) PCT Pub. No.: WO2005/072902

PCT Pub. Date: Aug. 11, 2005

(65) Prior Publication Data

US 2007/0040458 A1   Feb. 22, 2007

(30) Foreign Application Priority Data

Jan. 30, 2004   (JP) ............................. 2004-024153

(51) Int. Cl.
    *B23K 11/24*   (2006.01)
(52) U.S. Cl. ..................... 219/78.01; 219/50; 219/85.15
(58) Field of Classification Search .................. 219/62, 219/62.1, 76.17, 78.01, 85.1

See application file for complete search history.

(56) References Cited

U.S. PATENT DOCUMENTS

| 3,459,918 A | | 8/1969 | Rzant |
| 4,523,075 A | * | 6/1985 | Horii et al. ..................... 219/88 |
| 5,071,059 A | * | 12/1991 | Heitman et al. ............. 228/244 |
| 5,111,015 A | | 5/1992 | Riordan |
| 5,132,581 A | * | 7/1992 | Kusase ....................... 310/263 |
| 5,281,881 A | * | 1/1994 | Gentry et al. .......... 310/154.13 |
| 6,756,558 B2 | * | 6/2004 | Salzer et al. ................ 219/112 |

FOREIGN PATENT DOCUMENTS

GB   2151085 A   7/1985

(Continued)

OTHER PUBLICATIONS

Patent Abstracts of Japan JP 05-200560 Kakizaki Aug. 10, 1993.*
Machine Translation of JP 05-200560.*

(Continued)

*Primary Examiner* — Mark H Paschall
*Assistant Examiner* — Brian Jennison
(74) *Attorney, Agent, or Firm* — Sughrue Mion, PLLC

(57) ABSTRACT

A welding set and a welding method that suppresses the unnecessary magnetization of a permanent magnet member by a welding current when welding one metal member including a permanent magnet member and the other metal member together are obtained. The welding set is provided with a work retaining part 3 that retains a work 14; a pressure device 4 located over the work retaining part 3 with a work-providing space interposed; a first welding electrode 8 mounted on a moving part 4a of the pressure device 4; a second welding electrode 10; and a welding transformer 11 that supplies a welding current to both of the welding electrodes 8, 10. Both of the welding electrodes 8, 10 are located on one end side of the work 14 with respect to one metal member and the other metal member respectively, as well as are located so that there is no permanent magnet member 18 between respective abutment terminal of one metal member and the other metal member.

17 Claims, 14 Drawing Sheets

FOREIGN PATENT DOCUMENTS

| | | | |
|---|---|---|---|
| JP | 03057570 | * | 3/1991 |
| JP | 5-56616 A | | 3/1993 |
| JP | 09001357 | * | 1/1997 |
| JP | 9-155557 A | | 6/1997 |
| JP | 9-205757 A | | 8/1997 |
| JP | 9-262682 A | | 10/1997 |
| JP | 10-85947 A | | 4/1998 |
| JP | 11-32465 A | | 2/1999 |
| JP | 2000-092802 A | | 3/2000 |
| JP | 2000107867 | * | 4/2000 |
| JP | 3077923 | * | 8/2000 |
| JP | 2003-52157 A | | 2/2003 |
| JP | 2003-80371 A | | 3/2003 |

OTHER PUBLICATIONS

Masanobu Hamasaki, "Lap Resistance Welding", $1^{ST}$ edition, issued on Aug. 15, 1971, Published by Kaushiki Kaisha Sanpo, pp. 65, 205.

Yosetu Binran, "Welding Handbook", $2^{ND}$ edition, $4^{th}$ copy issued on Mar. 20, 1960, Published by Maruzen Kabushiki Kaisha.

* cited by examiner

Fig. 4
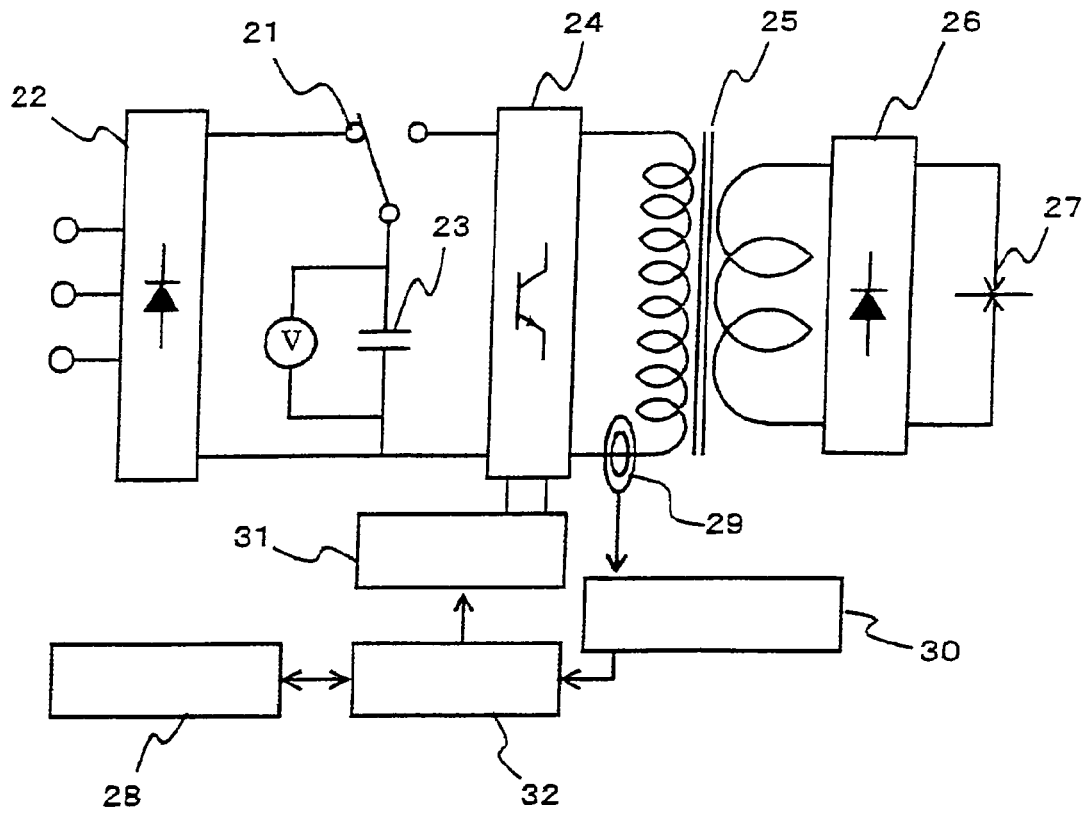
28 : INPUT·DISPLAY UNIT
30 : CURRENT MEASUREMENT CIRCUIT
31 : DRIVE CIRCUIT
32 : CONTROL CIRCUIT
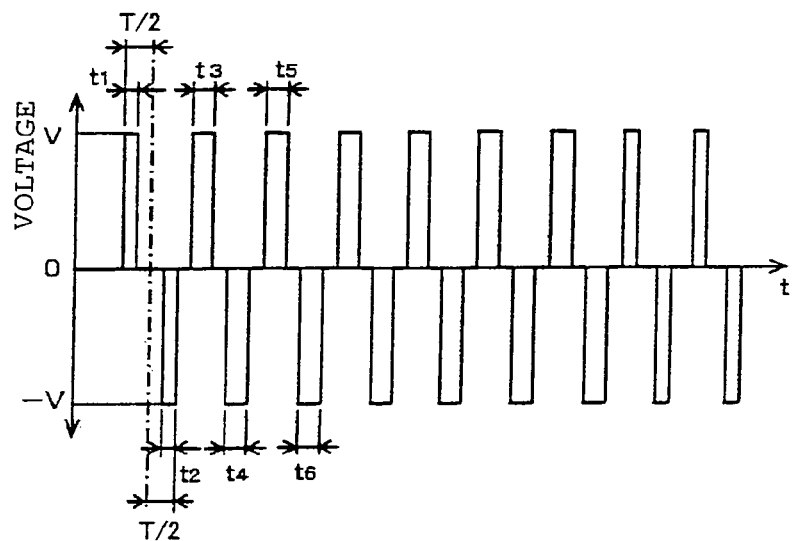
Fig. 5

(a)

(b)

WELDING SET OF METAL MEMBER INCLUDING PERMANENT MAGNET AND WELDING METHOD THEREOF, AS WELL AS ELECTRIC ROTATING MACHINE

TECHNICAL FIELD

The present invention relates to a welding set that makes the resistance welding of a metal member to another metal member including permanent magnet members, and the welding method thereof, as well as an electric rotating machine to be manufactured using this welding set.

BACKGROUND ART

As an example of products that are manufactured by welding a metal member to another metal member including permanent magnet members, there are rotors of an electric rotating machine. For example, in the case of rotors of a vehicle AC generator, the following rotor is disclosed. In this rotor, a pair of field cores (pole cores), which are abutted on a rotary shaft, have pawl-shaped magnet poles shaped to axially extend at the perimeter, and to be engaged with each other; permanent magnet members are mounted in gaps between the circumferentially opposed side faces of the adjacent pawl-shaped magnet poles; and cooling fans for suppressing the rise of temperature of a power generator are fixed at the axial front and back of this field core fixed by, e.g., welding (for example, refer to Patent Document 1).

Furthermore, as welding sets that weld cooling fans to a field core, for example, a welding set of welding cooling fans to a magnetic pole of a vehicle charging generator is disclosed. In this welding set, a shaft of a rotor is directed in a vertical direction; cooling fans are put on the back faces of magnetic poles; electrodes for welding are pressed from outside of the cooling fans; current is carried in sequence of the upper-side electrode, the upper-side cooling fan, the upper-side magnetic pole, the lower-side magnetic pole, the lower-side cooling fan, and the lower-side electrode, while pressing the electrodes located above and below to be welded. A welding current made to flow through a weld area at this time is generally DC (for example, refer to Patent Document 2).

Upon welding cooling fans of a rotor as shown in Patent Document 1 to pole cores, welding with the use of a welding set as shown in the Patent Document 2 undergoes the following manufacturing process. In this process, cooling fans are brought in contact at a predetermined position of axial end faces of pole cores after permanent magnet members have been mounted onto the pole cores; electrodes are held with one electrode electrically connected to one cooling fan, and the other electrode electrically connected to the other cooling fan located on the opposite side of the pole cores; and, for example, a pulsed current of dozens kA at peak value is carried between both of the electrodes to make the resistance welding. At this time, a welding current will flow through axially in the vicinity of the shaft of a rotor. As described above, since there are mounted permanent magnet members in gaps between the opposed faces of the pawl-shaped magnetic poles, in the case where a welding current flowing through a plurality of weld points is carried concentratedly, a magnetic filed that is generated by this large current will be in a magnetic field intensity large enough to magnetize permanent magnet members, and the permanent magnet members will be magnetized circumferentially in the same polarity. A purpose of the use of permanent magnet members of a rotor is to counteract magnetic fluxes being leaked in gaps between the adjacent pawl-shaped magnetic poles, so that it is necessary that an elongated permanent magnet member be polarized in different magnetic poles at both sides of a thickness direction. However, there arises such a trouble that half of permanent magnet members will be polarized in a direction opposite to the direction to be originally polarized under the influence of a welding current as described above. A magnetization at this time, through experiments made by inventors, is confirmed to exceed 80% on average when letting a full magnetization 100%.

Normally, it is desirable to employ, as magnets for use in a rotor of electric rotating machines, magnets having a high residual magnetic flux density for the purpose of improving a starting torque, as well as having a high coercive force so as to be resistant to operating conditions at high temperature (e.g., neodymium magnets). In the case of magnets of high coercive force, however, once the magnets have been polarized in the opposite direction, a stronger magnetic field will be required as compared with the first-time polarization in order to make the forward polarization next, resulting in the insufficient polarization in the normal polarization process. Furthermore, since iron power, which is produced at the time of machining, sticks to the polarized magnets not to be removed, and the iron powder remains as foreign substance after assembling as an electric rotating machine, a problem exits in the occurrence of such a trouble as coils are damaged to be short-circuited.

Patent Document 1: the Japanese Patent Publication (unexamined) No. 56616/1993 (pages 2-3, FIG. 1)

Patent Document 2: the Japanese Patent Publication (unexamined) No. 205757/1997 (page 2, FIG. 2)

DISCLOSURE OF THE INVENTION

Problems to be Solved by the Invention

The present invention was made to solve the problems as described above, and has an object of providing a welding set of metal members including permanent magnet members making it possible to suppress unnecessary polarization of the permanent magnet members, in the case where a metal member including permanent magnet members and another metal member are combined by welding, for example, in rotors provided with permanent magnet members; and another object is to provide a welding method thereof; as well as a further object is to provide an electric rotating machine to be manufactured with the welding set.

Means of Solution to the Problem

A welding set of a metal member including permanent magnet member according to the invention that makes resistance welding of one metal member including a permanent magnet member and the other metal member of a work consisting of both of the metal members, comprises:

a work retaining part that retains a work;

a pressure device that is located above the work retaining part with a work-providing space interposed;

a first welding electrode that is mounted on the moving part side of the pressure device, and is made to abut on the work;

a second welding electrode that is made to abut on the work; and a welding transformer that supplies a welding current to both of the welding electrodes; and in which both of the welding electrodes are located on one end side of the work with respect to one metal member and other metal member respectively; as well as are located so that there is no permanent magnet member between respective abutment terminals of one metal member and the other metal member.

Further, a welding method of a metal member including a permanent magnet member according to the invention is the one by which the mentioned welding current is supplied to the mentioned work from both of the mentioned welding electrodes using the welding set constructed as mentioned above to make resistance welding.

Furthermore, a welding set of a metal member including a permanent magnet member according to the invention, a work being a rotor of an electric rotating machine, this rotor comprises: a pair of pole cores in which plural pawl-shaped magnetic poles that are formed on respective outer circumferential sides are engaged with each other to be disposed in an axial opposition; a shaft that goes through the pole cores; a plurality of permanent magnet members that are disposed between the pawl-shaped magnetic poles being adjacent in a circumferential direction of the pole cores; a field coil that is mounted in an internal part of the pole cores to excite a pair of the pole cores in different magnetic poles; and a plate member mounted on an axial end face of the pole cores; and in which a welding current is supplied between the mentioned plate member and the mentioned pole core side from a first welding electrode and a second welding electrode that are located on the same axial end side of the rotor.

Moreover, an electric rotating machine according to the invention is provided with a rotor that is manufactured with the mentioned welding set.

Furthermore, a welding set of a metal member including a permanent magnet member according to the invention that makes resistance welding of one metal member including a permanent magnet member and the other metal member of a work consisting of both of the metal members, the welding set is equipped with an AC generator that generates AC as a welding current, and supplies the AC welding current to a work through a first welding electrode and a second welding electrode from the AC generator.

Effect of the Invention

According to a welding set of a metal member including a permanent magnet member of the invention or a welding method thereof, the first welding electrode and the second welding electrode that are made to abut on a work are located on one end side of the work with respect to one metal member and other metal member respectively; as well as are located so that there is no permanent magnet member between respective abutment terminals of one metal member and other metal member. As a result, it is possible to cause a welding current path flowing through the work to be away from the permanent magnet members, and it is possible to make smaller the effect on the permanent magnet members by the magnetic field that is generated by a welding current. Consequently, a smaller magnetization of the permanent magnet members after the end of welding may be achieved.

Further, according to a welding set of a metal member including a permanent magnet member of the invention, a work is a rotor of an electric rotating machine. Moreover, in the case of welding a plate member to a pole core of a rotor including permanent magnet members, a welding current is supplied between the plate member and the pole core side from the two welding electrodes that are located on the same axial end side of the rotor to be fixed by resistance welding. As a result, it is possible to prevent a welding current from flowing in a concentrated manner axially in an internal part of the pole cores, thus enabling to suppress the unnecessary magnetization of permanent magnet members generated by the welding current.

In addition, according to an electric rotating machine of the invention, it is provided with a rotor manufactured with the use of the welding set as mentioned above. As a result, no process of de-magnetizing the permanent magnet members unnecessarily magnetized by a welding current is required, resulting in the improvement in productivity.

Furthermore, a welding set is equipped with an AC generator that generates AC as a welding current, and the AC welding current is supplied to a work through the first welding electrode and the second welding electrode from the AC generator. As a result, based on the fact that directions of a magnetic field that is generated by a welding current are different, permanent magnet members having been magnetized temporarily is de-magnetized, thus enabling to make a magnetization of the permanent magnet members after the end of welding smaller.

BEST MODE FOR CARRYING OUT THE INVENTION

Embodiment 1

FIG. 1 is a schematic view of a welding set of a metal member including permanent magnet members according to a first preferred embodiment of the present invention. FIG. 2 is a partially cross sectional view of an enlarged work and its vicinity of FIG. 1.

According to this first embodiment, as works, being objects to be welded, that is, works formed of one metal member including permanent magnet members and the other metal member, a rotor of an electric rotating machine including permanent magnet members is described as an example. One metal member including permanent magnet members is a pole core, and the other metal member is a cooling fan.

First, the construction of a welding set 1 is described. As shown in FIG. 1, there is provided on a base 2 a work retaining part 3 that holds the later-described work 14, and there is located a pressure device 4 that is supported by a support, not shown, and that is constructed of, for example, an air cylinder via a work-providing space above this work retaining part 3. A top 6 is attached to a moving part 4a, which moves up and down, of the foregoing pressure device 4 via an elastic member 5 that is made of, for example, urethane rubber, and a first welding electrode holder 7 is fixed to this top 6. A plurality of first welding electrodes 8 are attached to the first welding electrode holder 7. Furthermore, a second welding electrode holder 9 is disposed in the vicinity of the first welding electrode holder 7, and a plurality of second welding electrodes 10 are attached to this second welding electrode holder 9. The second welding electrode holder 9 is driven by a moving mechanism (different from the above-mentioned moving part 4a) that is attached to a supporting member, not shown, and can press the second welding electrodes 10 to predetermined points of the work 14.

Welding transformers 11 functioning to supply an electric power to the first welding electrode 8 and the second welding electrode 10 are located, one on either side with respect to the work 14. The two welding transformers 11 are of the same specification, and are electrically connected in parallel. One electrode of the welding transformer 11 is electrically connected to the first welding electrode 8 via a jumper cable 12, the top 6, and the first welding electrode holder 7. The other pole of the welding transformer 11 is electrically connected to the second welding electrode 10 via the jumper cable 12 and the second welding electrode holder 9. In this manner, it is arranged such that a welding current is supplied to a plurality of weld points with the two welding transformers 11 that are electrically connected in parallel, and a plurality of weld points can be welded simultaneously.

There is provided an insulting member 13 on the work side of the work retaining part 3 in order to provide an electrical insulation from the work 14 to be mounted. The above-mentioned parts indicated by 2 to 13 and a control device, not shown, form a major part of the welding set 1.

As described above, the case where a work is a rotor of an electric rotating machine is shown, and FIG. 2 shows a work and its vicinity in detail. As shown in FIG. 2, a work 14 comprises a cooling fan 15, a pole core 16 including a pawl-shaped magnetic pole 16a, a pole core 17 including a pawl-shaped magnetic pole 17a, permanent magnet members 18 fixed between the pawl-shaped magnetic poles 16a, 17a, a field winding 19 located in an internal part of the pole cores 16, 17, and a shaft 20 press-fitted in the pole cores 16, 17. The cooling fan 15 is welded to an end face of the pole core 16 to be fixed using the welding set 1.

The arrangement relation of both of the welding electrodes 8, 10 is now described. Both of the welding electrodes 8, 10 are located on one end side of the work 14 with respect to the pole core 16 (one metal member) and the cooling fan 15 (the other metal member) respectively. In addition, the welding electrodes 8, 10 are located so that when the first welding electrode 8 is made to abut on the cooling fan 15 and the second welding electrode 10 is made to abut on the pole core 16, no permanent magnet member 18 is interposed between respective abutted terminals.

Now, the welding method in the case of welding a cooling fan 15 to a pole core 16 using the welding set 1 according to this first embodiment is described. The cooling fan 15 is aligned with a predetermined position of an end face of the pole core 16, and the second welding electrode 10 is made to abut on the pole core. Next, an air pressure of the pressure device 4 is increased, and the first welding electrode 8 is made to abut on a surface of the cooling fan 15. Further, an air pressure of the pressure device 4 is increased, and the cooling fan 15 is pressed to an end face of the pole core 16 with the first welding electrode 8, and then a welding current is supplied from the welding transformer 11. Whereby, the welding current flows through the portion at which the cooling fan 15 that is pressed by means of the first welding electrode 8 and the pole core 16 are in contact to provide the resistance-heating, and the cooling fan 15 and the pole core 16 are welded together. By forming a projection at a weld point of the cooling fan 15, a contact portion of the cooling fan 15 and the pole core 16 is restricted, and a welding current is concentrated, thus enabling to obtain a more consistent welding quality with a smaller welding current. This welding method is generally referred to as projection welding out of resistance welding.

Now, operations are described. A permanent magnet member 18 that is mounted onto a work 14 is required to be polarized in a polar direction that a product requires. Thus, it is unfavorable to impair the original polarization with a welding current. For example, with reference to FIG. 2, in the case where the second welding electrode 10 is not located in a position shown in the drawing, but on the other side via the pole cores 16, 17, that is, it is abutted on the lower side of the pole core 17, then a welding current goes axially through both of the pole cores 16, 17 to flow in parallel with the shaft 20. This current will cause the permanent magnet members 18 to be polarized in a direction different from an originally necessary direction.

To cope with this, in the welding set 1 according to the invention, as described above, the first welding electrode 8 and the second welding electrode 10 are located on one end side of the work 14, as well as located so that no permanent magnet member 18 is interposed between respective abutted terminals with respect to the cooling fan 15 and the pole core 16. Therefore, a welding current path will be formed as indicated by the arrow of FIG. 2 and comes away from the permanent magnet member 18. Further, a magnetic field that is generated by a welding current gives little effect on the permanent magnet members 18, and a smaller magnetization of the permanent magnet members 18 after the end of welding is achieved. As a result, due to the fact that permanent magnet members can be magnetized to a desired level only in an original polarization process without adding any de-magnetization process after welding, it is possible to achieve the improvement in productivity and the reduction of manufacturing costs.

With reference FIGS. 1 and 2, a position where the second welding electrode 10 is abutted on the pole core 16 is at a portion that is on an end face of the pole core 16, as well as that is not covered with the inner circumferential side of cooling fan 15. However, on one end side of a work, for example, as shown in FIG. 3, it is preferable that a position of the second welding electrode 10 being abutted is at a chamfer portion around the perimeter of the pole core 16, or is on an end face of the shaft 20 on one end side of the pole core 16. Further, in the case of dividing the work into one end portion and the other end portion, one end side of a work represents a half side thereof.

In addition, in the welding set 1 according to the invention, the work retaining part 3 and the work 14 are electrically insulated from each other reliably through an insulating member 13. This insulating member 13 functions to block a welding current from flowing from the work 14 side to the work retaining part 3. Owing to the fact that the welding transformer 11 is electrically insulated, a welding current flowing in the vicinity of the permanent magnet members 18 is not shunted through the work 14 to the work retaining part 3, thus enabling to reliably cause a welding current path of both of the welding electrodes 8, 10 to be away from the permanent magnet members 18.

Furthermore, with reference to FIGS. 1 and 2, insulation between the work retaining part 3 and the welding transformer 11 is carried out by disposing the insulating member 13 between the work 14 and the work retaining part 3. However, it is preferable that a work retaining part 3 itself is made of an insulating material.

Moreover, shown in FIG. 1 is the case where the number of welding transformers 11 is two, and they are located one on either side of a work-providing space. Although only one welding transformer 11 may be located, the action and effect in the case of locating plural numbers, for example, two welding transformers as shown in the drawing, are described. A welding current comes to be larger as weld points approach the welding transformer 11 due to the decreased resistance. In case of one welding transformer 11, distances between each of the weldpoints and the welding transformer 11 are different, and there are also different welding currents, resulting in some cases where the fluctuations in weld strength at each weld point occur. In contrast, by using two welding transformers 11 electrically connected in parallel, the difference in distances between each weld point and the welding transformer 11 comes to be smaller, and welding currents flowing through each of the weld points will be equalized. Further, these two welding transformers 11 are located one on either side with respect to the work 14, and the front is open widely to act as a work introduction portion. Thus, mechanism (not shown) for mounting/dismounting a work 14 with respect to a welding set 1 may be simply constructed.

With reference to FIG. 1, the case of two welding transformers is shown as example. The number is not limited to two, and the same effect can be obtained only with a plurality of welding transformers.

Now, the operation of an elastic member 5 that is attached between the moving part 4a of the pressure device 4 and the top 6 is described. The first electrode holder 7 is fixed to the top 6, and further a plurality of first welding electrodes 8 are attached. At the beginning of welding, the moving part 4a of the pressure device 4 (for example, air cylinder) goes down accompanied by the increase of an air pressure of the pressure device 4, and the first welding electrodes 8 are pressed onto a surface of the cooling fan 15. At this time, supposing that end faces of a plurality of first welding electrodes 8 and a top face of the cooling fan 15 are not in fully close contact, an eccentric contact may take place. Since there is provided an elastic member 5, however, the top 6, that is, a plurality of first welding electrodes 8 connected thereto oscillate so as to follow a surface of the cooling fan 15, and are brought in contact without eccentric contact. Thus, a sufficient contact area between the first welding electrode 8 and the cooling fan 15 is assured resulting in the suppression of abnormal heat generation.

Furthermore, it is preferable that an elastic member 5 employs a compression spring, leaf spring, or the like other than urethane rubber. In addition, it is preferable that the second welding electrode 10 side is likewise made to oscillate to prevent the eccentric contact.

Now, an electric circuit to supply a welding current to the welding transformer 11 is described. FIG. 4 is a diagram showing one example of an electric circuit. First, a switch 21 is connected to a charging circuit side, and a power supply input of three-phase AC is converted to DC with a rectifier circuit 22 to be charged and stored in a capacitor 23. Next, the switch 21 is switched to the discharge circuit side, an electric power having been charged and stored in the capacitor 23 is discharged to the discharge circuit, and current is supplied to the primary side coil of the welding transformer 25 via a switching circuit 24. A large current having been transformed with the welding transformer 25 is supplied to a welding head 27 via a rectification•polarity switching circuit 26, and a work is welded. Values such as current values or times intended to supply to the welding head 27 are set with an input•display unit 28. It is arranged such that currents actually flowing through the primary coil of the welding transformer 25 are monitored all the time with a current sensor 29 and a current measurement circuit 30; and a drive circuit 30 of the switching circuit 24 is controlled by a control circuit 31 so as to cause a difference between a value required from a set value and a monitored value to come close to zero.

In addition, the welding transformer 25 corresponds to the welding transformer 11 of FIG. 1.

The control method is described in detail referring to the drawing. FIG. 5 indicates a voltage waveform by means of a switching circuit 24 on the primary side of the welding transformer 25. With this switching circuit 24, a DC voltage is converted into an AC voltage having a peak voltage V and a frequency T. Pulse widths $t_1$, $t_2$ . . . of this AC voltage are controlled by the drive circuit 31. By causing these pulse widths to change, effective values of AC voltage are controlled to obtain desired current values. An image of this control is indicated in FIG. 6.

When a desired current value I is inputted from the input•display unit 28 to the control circuit 32, in the control circuit 32, a current value I having been set is recognized as current set values $I_{01}$ to $I_{0X}$ for respective pulses, and at the same time effective values $V_{01}$ to $V_{0X}$ of AC voltage are set.

When a signal of the start of energization is generated, at a first pulse, the switching circuit 24 is brought in an open circuit by means of the drive circuit 31 by a pulse width corresponding to a voltage effective value $V_{a1}$ the same as $V_{01}$. A current flowing at this time is measured with a current sensor 29, and is transmitted from the current measurement circuit 30 to the control circuit 32. In the control circuit 32, this current measured value $I_{a1}$ and a current set value $I_{01}$ are compared, and a difference between them is converted to a voltage compensation value $\Delta V_2$ of the next pulse. Further, a voltage value $V_{a2}$ to be applied at the subsequent pulse is determined to be $V_{02}$-$\Delta V_2$, and the switching circuit 24 is brought in ON by a pulse width corresponding to this $V_{02}$-$\Delta V_2$ by means of the drive circuit 31. The repeated operations of compensating a voltage value from a current measured value flowing at this time to bring the switching circuit 24 in ON by the drive circuit 31 cause a current actually flowing to approach a desired current value.

Based on the fact that welding current values, hold times, and polarities can be set without restraint by this electric circuit, a welding current may be in an AC welding current waveform, thus enabling to change magnitudes, or to hold a peak current over a specified time period. Accordingly, a magnetization of a permanent magnet member after the end of welding can be suppressed to an extremely small value.

Moreover, using such an electric circuit, for example, in the case of welding a cooling fan to a rotor of vehicle AC generators as a work, a power supply of electric capacity 200 kVA class is needed at a power supply voltage 400V with the conventional AC power supply, resulting in the restrictions of being hard to install it at a place of a small power receiving capacity. In contrast, by being equipped with a capacitor functioning to charge an electric power for carrying a welding current as described above, a power supply of approximately electric capacity 20 kVA at a power supply voltage 200V can be employed.

In addition, according to this first embodiment, the case of projection welding is described. However, the invention is applied to the other resistance welding such as spot welding or resistance brazing to be capable of obtaining the same effect. Furthermore, the invention is applicable to any work of the resistance welding of a metal member to another metal member including permanent magnet members other than rotors of an electric rotating machine.

As described above, according the invention of this first embodiment, the following elements are provided: a work retaining part that retains a work; a pressure device located above the work retaining part with a work-providing space interposed; a first welding electrode that is mounted on the moving part side of the pressure device, and is made to abut on said work; a second welding electrode made to abut on the work; and a welding transformer supplying a welding current to both the welding electrodes; and both of the welding electrodes are located on one end side of the work with respect to one metal member and the other metal member respectively; as well as they are located so that there is no permanent magnet member between respective abutment terminals of one metal member and the other metal member. As a result, it is possible to provide a welding set and a welding method making it possible to suppress the magnetization of permanent magnet members generated by a welding current when welding a work consisting of one metal member including permanent magnet members and the other metal member, and to polarize permanent magnet members at a desired magnetization level only in the original polarization process without the addition of de-magnetization process after the end of welding.

Moreover, the work retaining part and the work are electrically insulated from each other through an insulating member. As a result, a welding current is not shunted through a work to the work retaining part, thus enabling to reliably cause a welding current path of both of the welding electrodes to be away from the permanent magnet members. Consequently, a smaller magnetization of the permanent magnet members of a work after the end of welding is achieved.

Further, a plurality of welding transformers are electrically connected in parallel, and plural weld areas are simultaneously welded with the use of both of the welding electrodes that are connected to each of the welding transformers. As a result, currents flowing through a plurality of weld areas by means of plural welding transformers are equalized. Consequently, the fluctuations in weld strength at each weld point become smaller, resulting in the improvements in welding quality and in reliability of products.

Furthermore, at least either of both of the welding electrodes is arranged to oscillate by being in contact with a work. As a result, the eccentric contact of a welding electrode with a work can be prevented. Thus, the abnormal heat generation between the welding electrode and a work is suppressed to be capable of suppressing the damage of a welding electrode end face or a work surface. Furthermore, due to equalized applied pressures, the fluctuations in weld strength at each weld point comes to be smaller, enabling to obtain welded areas of high quality. Moreover, an electrode end face is less likely to be damaged, and an operating life of electrodes becomes longer, resulting in the improvement in productivity. Further, particularly in the case where a work is a galvanized steel plate, the reduction of corrosion resistance owing to the damage of surface can be prevented, resulting in higher reliability of products.

In addition, there is provided an electric circuit making it possible to set a current value and duration thereof, and a polarity of a welding current. As a result, it is possible to set a welding current waveform enabling to achieve a smaller magnetization of permanent magnet members after the end of welding depending on configurations or surface states of weld areas.

Moreover, the electric circuit comprises: a capacitor in which an electric power is charged and stored; a switching circuit that converts a discharge current from the capacitor into AC to supply it to the welding transformer; a control circuit that controls the switching circuit; an input section that sets a set value for obtaining a predetermined current waveform to the control circuit; and a current sensor that monitors an output current from the switching circuit; and in which a welding current is controlled while comparing the output current and the set value. As a result, it is possible to easily obtain a welding current having a desired current waveform.

Furthermore, the work is a rotor of an electric rotating machine. In the case where a cooling fan is welded to a pole core, a magnetization of permanent magnet members after the end of welding becomes smaller, thus enabling to polarize permanent magnet members at a desired magnetization level only in the normal polarization process without the addition of de-magnetization process after the end of welding. Consequently, it is possible to achieve the improvement in quality and productivity of electric rotating machines and the reduction of manufacturing costs. Particularly, in the case of such an electric rotating machine as is mounted on vehicles, which require high reliability, the improved reliability contributes to higher commercial value.

Embodiment 2

According to a welding set shown in a second embodiment, an object work is limited to a rotor of the electric rotating machine including permanent magnet members. That is, this is the case where one metal member that includes permanent magnet members is a pole core, and the other metal member is a plate member (for example, a cooling fan). FIG. 7 is a perspective view showing a rotor of the electric rotating machine, being an object work of the welding set according to the second embodiment. FIG. 8 is a cross sectional view showing the upper half of an electric rotating machine into which the rotor is integrated. Further, FIG. 9 is a side cross sectional view of FIG. 7. In addition, the construction of a welding set itself is equivalent to that described in the foregoing first embodiment, so that descriptions are omitted. Welding electrodes 109, 110 that are described hereinafter in this second embodiment correspond to the welding electrodes 8, 10 having been described in the first embodiment.

First, an overall structure of a rotor is described with reference to FIGS. 7 and 9. Lundell-type pole cores 101 and 102 are normally made of iron. These pole cores 101 and 102 consist of cylindrical bases 101a and 102a including axially through holes for a shaft 103, and a plurality of pawl-shaped magnetic poles 101b, 102b that extend in substantially trapezoidal shapes at a predetermined pitch circumferentially on the outer circumferential side of the bases 101a, 102a. It is constructed such that this pair of pole cores 101, 102 are assembled so that the pawl-shaped magnetic poles 101b, 102b are engaged with each other to be disposed axially in opposition, the shaft 103 is press-fitted in these through holes to be fixed, and the assembled poles cores 101b, 102b rotate integrally with the shaft 103. Thus, apparently, the pawl-shaped magnetic poles 101b, 102b are assembled and located so as to be circumferentially in alternating patterns. A permanent magnet member 104 that is polarized in a direction of decreasing the leakage of magnetic flux between the pawl-shaped magnetic poles 101b, 102b is mounted in each gap between the pawl-shaped magnetic poles 101b, 102b. Furthermore, field coils 105 acting to energize both of the pole cores 101, 102 in different magnetic poles are mounted in the internal part of the pole cores 101, 102. Further, there is provided at one end of the shaft 103 a slip ring 106, which is electrically connected to the field coils 105, so that current is supplied from outside via this slip ring 106 (and brush, not shown). Plate members are fixed by welding to substantially flat portions at both axial ends of the pole cores 101, 102. The drawings show the case where a cooling fan 107 is mounted as a plate member. Although the detailed description of the cooling fan 107 will be made later, the cooling fan 107 consists of a flat portion 107a to be a face welded to the pole core 101 or 102, and blades 107b that are formed at the peripheral portion by cutting-and-raising. The above-mentioned components of reference numerals 101 to 107 form the rotor 108.

FIG. 8 is a cross sectional view showing an example of an electric rotating machine equipped with the foregoing rotor 108. A stator 121 is located at the peripheral portion of the rotor 108 with a slight gap with respect to the pawl-shaped magnetic poles 101b, 102b of the pole cores. A bracket 122 that houses these parts, as well as journals the shaft 103 is located so as to enclose the entire structure. Further, there is provided a pulley 123 at the shaft 103, which is driven to rotate by means of belt.

Now, the welding method in the case of welding a cooling fan 107 to an axial end face of a rotor 108 is described. As shown in FIG. 9, first the cooling fan 107 on one side (on the upper side in the drawing) is brought in contact at a predetermined position on an axial end face of the pole core 101. Out of the first welding electrode 109 and the second welding electrode 110 of the welding set (not shown), the first welding electrode 109 is brought in electrical contact at a predetermined weld position (weld point 111) of the cooling fan 107, and the second welding electrode 110 is brought in electrical contact at a predetermined weld position on an axial end face of the pole core on the same end side of the electrode 109. After both of the welding electrodes 109, 110 have been set, a large pulsed current is carried from the welding set via both of the welding electrodes 109, 110 to make the welding by resistance welding. Subsequently, as to a cooling fan 107 on the other side (on the lower side in the drawing), likewise both of the welding electrodes 109, 110 are brought in electrical contact with the cooling fan 107 and the pole core 102 from the same end side respectively to make the resistance welding.

Additionally, in the case of low heat generating from a rotor, it is preferable for a cooling fan to be mounted on one side.

In the welding process, a welding current flows through a path indicated by the arrows in FIG. 9 (however, current flows in alternate directions in the case of AC). Since both of the welding electrodes 109, 110 are located on the same axial end side of the rotor 108 as shown in the drawing, no welding current, being a large current, axially goes through the pole cores 101, 102 to flow toward an end face on the other side in the vicinity of the shaft. Therefore, it is possible to suppress the magnetization of the permanent magnet members 104 resulted from the flow of a welding current.

Further, FIG. 9 shows a state of welding one point of the cooling fan 107. In the case, however, of welding simultaneously at several points for the purpose of increasing working efficiency, it is preferable that plural numbers of both of the welding electrodes 109, 110 are provided respectively, and the electrodes are brought in contact at predetermined weld points at the same time to make the welding.

Furthermore, under the conditions that both of the welding electrodes 109, 110 are located on the same axial end side of the rotor 108, it is preferable that the welding electrode 110 is positioned, for example, at the peripheral shoulder (portion largely chamfered at an angle of 45°) of the pole core 101 or 102, or at the portion where the pole core 101 or 102 is exposed between the blades 107b of the cooling fan 107 as described below.

To suppress the effect on permanent magnet members 104 as much as possible, and to make the magnetization smaller, desirably the welding electrode 110 is located so that a welding current flowing through the pole core 101 or 102 is carried in a direction of being away from the permanent magnet members 104 with a weld point 111 being a base point, and further both of the welding electrodes 109, 110 are located in the vicinity due to a shorter path of a welding current in the pole core 101 or 102. Now, the configuration of a cooling fan 107 designed for this shorter current path is hereinafter described.

FIG. 10 and FIG. 11 are views respectively showing one example of configuration of a cooling fan 107. As described in the drawings, the cooling fan 107 is made of, e.g., thin steel plate, and a contour thereof is substantially circular; curved (may be planar) blades 107b, which are located in non-equiangular way radially are formed by cutting-and-raising from a flat portion 107b; and reinforcing ribs 107c are provided from the flat portion 107a to the blades 107b for strength. The reason why the blades 107b are located in non-equiangular way is that the dispersion of noise order component spectrum of cooling air is achieved, resulting in the reduction of noise.

Further, the weld point of the cooling fan 107 has preliminarily been embossed in, for example, a diameter of 2-3 mm in order to bring the weld area in point contact with an end face of the pole core 101 or 102.

The cooling fan according to this second embodiment is characterized in that notches 107d are formed in a part of the flat portion 107a of the cooling fan 107 in order to enable the second welding electrode 110 on the pole core side to be located in the vicinity of a weld point 111, being a position of the first welding electrode 109 on the cooling fan side, at the time of welding. FIG. 10 shows the case where there are provided notches 107d with respect to the weld points 111 on the inner circumferential side of the flat portion 107a of the cooling fan 107. FIG. 11 shows the case where there are provided notches 107d also at the flat portion 107a between the blades 107b on the outer circumferential side of the cooling fan 107. A portion indicated by broken line around a weld point in the drawings is an electrode position 112 on the cooling fan side. A portions indicated by netting is an electrode position 113 on the pole core side. Moreover, it is preferable to provide through holes instead of notches.

The number of the first welding electrodes 109 on the cooling fan side and the number of the second welding electrodes 110 on the pole core side are not necessarily the same. For example, as shown in FIG. 11, it is preferable to be one electrode position (イ) on the pole core side with respect to two electrode positions (ア) on the cooling fan side. It is desirable that contact areas of corresponding welding electrodes are substantially equal.

Additionally, in the case of welding all the weld points simultaneously, supposing that welding electrodes on the pole core side are not located individually with respect to weld points 111 as shown in FIG. 10 or 11, but, for example, a welding electrode on the pole core side is formed to be a cylindrical electrode having a contour smaller than an inner diameter of a cooling fan 107, a larger contact area may be obtained with only one welding electrode. It is preferable that this welding electrode is located so as to lap the shaft 103 coaxially with the shaft 103 to be made to abut on an end face of the pole core.

Although the case where a plate member is a cooling fan is described above, for example, there is the following plate member being a work other than a cooling fan. FIG. 12 are explanatory views for explaining the welding method in the case of attaching a foreign substance barrier plate as a plate member. FIG. 12(a) is a planar view, and FIG. 12(b) is a side cross sectional view partially omitted. Reference numerals 101, 103-105, 109-111 are the same as those of FIG. 9, so that the descriptions thereof will be made omitted. Further, the welding method is also the same as that described in FIG. 9.

A foreign substance barrier plate 114 is the one that is provided to prevent foreign substances from entering an internal part of the rotor from openings between pawl-shaped magnetic poles of pole cores. This foreign substance barrier plate 114 is made of a thin steel plate of which outer diameter is substantially equal to an outer diameter of the pole core. Since the rotation of a rotor is accompanied by the heat generation, vent holes 114a for introducing a cooling medium into an internal part of the rotor are formed as shown in the drawing. Thus, it is possible to prevent foreign substances larger than a hole diameter of the vent hole 114 from entering. In the case of small heat generation and there is no need of introducing a cooling medium through vent holes 114a, it is preferable that no vent holes 114a are provided.

FIG. 13 show a further example of the other plate member, and are explanatory views of explaining the welding method in the case of attaching a magnet falling prevention plate 115 as a plate member. FIG. 13(a) is a planar view, and FIG. 13(b) is a partially omitted side cross sectional view. Parts other than a magnet falling prevention plate 115 are the same as those of FIG. 12, so that the descriptions of corresponding parts will be omitted. Permanent magnets 104, as explained in FIG. 7, are mounted between pawl-shaped magnet poles that are formed so as to extend in substantially trapezoidal shapes circumferentially at a predetermined pitch of a pole core 101, thus being disposed axially at a certain angle with respect to an axis of rotation of a shaft 103. Accordingly, during the rotation of a rotor, a force of causing the permanent magnet members 104 to axially get out is exerted. The magnet falling prevention plate 115 functions to prevent this. The magnet falling prevention plate 115 is made of a thin steel plate which outer diameter substantially equals to an outer diameter of the pole core, and a peripheral part 115a is inwardly bent and this peripheral part 115a prevents the permanent magnet members 104 from axially getting out.

In addition, as in the case of the above-described cooling fan 107, it is preferable that notches or through holes are formed in the foreign substance barrier plate 114 or the magnet falling prevention plate 115.

Further, also in the case where not less than two pieces of plate members such as a cooling fan and foreign substance barrier plate or a cooling fan and magnet falling prevention plate are superimposed to be used, the invention according to this second embodiment is applied to make the welding by the same welding method.

As the layout of welding electrodes, although the second welding electrode that is made to abut on a pole core is heretofore described, a further example is shown in FIG. 14. Reference numerals 101 to 111 of FIG. 14 are the same as those of FIG. 14, so that the description of reference numerals and operations is omitted. As shown in the drawing, out of two welding electrodes, the first welding electrode 109 is pressed to the cooling fan, and the second welding electrode 110 is pressed to a shaft 103 on the same axial end side of a rotor 108 to be brought in electrical contact. This current path is far away from the permanent magnet members 104, and further current is not carried in parallel with a longitudinal direction of the permanent magnet members 104. In addition, it is a matter of course to obtain the same effect also in the case of the other plate member instead of the cooling fan 107.

As described above, according to the invention of this second embodiment, a plate member is attached such that the plate member is brought in contact with an axial end face of a pole core after a permanent magnet member has been mounted on the pole core, and a welding current is supplied between the plate member and the pole core from two welding electrodes that are located on the same axial end side of the rotor to be fixed by resistance welding. As a result, it is possible to prevent a welding current from flowing in a concentrated manner in an axial direction of a rotor, thus enabling to suppress the unnecessary magnetization of permanent magnet members generated by the welding current. Thus, it comes to be possible for permanent magnet members to be sufficiently magnetized in the original polarization process. Furthermore, it is possible to suppress the adhesion of iron powder to the permanent magnet members in the manufacturing process after welding of plate members until it reaches the original polarization process, resulting in the improvement in productivity.

In addition, according to an electric rotating machine equipped with a rotor that is manufactured with this welding set, no process of de-magnetizing the permanent magnet members unnecessarily magnetized by a welding current is required, resulting in the improvement in productivity.

Further, there is provided in a plate member a notch or a through hole for attaching an electrode on the pole core side. As a result, it is possible to place two electrodes in the proximity without concern for constraints of the layout of electrodes at the time of welding, resulting in a shorter path of a welding current flowing through the pole cores. Consequently, it is possible to minimize the magnetization of permanent magnet members by a welding current.

Furthermore, the first welding electrode out of two welding electrodes is brought in electrical contact with the plate member, and the second welding electrode is brought in electrical contact with a shaft to make resistance welding. As a result, no welding current flows in parallel with a longitudinal direction of permanent magnet members, thus making it possible to prevent the unnecessary magnetization of the permanent magnet members generated by the welding current. Moreover, the simpler layout of electrodes is achieved by fixing one of the two electrodes to the shaft, thus enabling to shorten an operating time period of welding.

In addition, although pole cores of Lundell type are described as rotors, any other rotor constructed so as to comprise permanent magnet members at the perimeter, and constructed such that a plate member such as cooling fans is fixed by welding to an axial end face of the rotor, may obtain the same effect as a matter of course.

Embodiment 3

Now, a welding set of metal members including permanent magnet members according to a third embodiment of the invention is described referring to the drawings. As described above, a work formed of one metal member including permanent magnet members and the other metal member is an object to be welded. Further, this welding set is equipped with an AC generator that generates AC as a welding current, and supplies an AC welding current to a work through the first and second welding electrodes from the AC generator to make the resistance welding. This welding set is characterized in a welding current waveform thereof. As a construction of the welding set, it is preferable to be, for example, a set as that shown in FIG. 1 and described in the foregoing first embodiment. As an AC generator, it is possible to employ, for example, an electric circuit as shown in FIG. 4 and described in the first embodiment.

A welding current to be generated at an AC generator is AC, and hereinafter a specific current waveform will be described.

FIG. 15 is a chart showing one example of a welding current waveform in the case of welding metal members including permanent magnet members. As described in the drawing, it is a current waveform in which amplitudes attenuate with the passage of time. That is, current is carried in 1.5 cycles at the same amplitude, and thereafter the amplitudes attenuate at a constant rate with the passage of time. Further, while a polarity of half cycle immediately after the start of energization is plus, a polarity of half cycle just before the end of energization is minus. (It is important that a polarity of half cycle immediately after the start of energization and a polarity of half cycle just before the end of energization are different, and it is also preferable to start the energization of half cycle of minus polarity.)

Now, action of the foregoing welding current is described. On the supposition of welding metal members including permanent magnet members in a DC welding current waveform, in the case where a welding current flows in the vicinity of the permanent magnet members, the permanent magnet members are magnetized by a magnetic filed generated by the welding current. At this time, when the permanent magnet members are largely polarized in a direction opposite to a polarization direction that the permanent magnet members originally require, a sufficient magnetization cannot be obtained in the subsequent normal polarization process, thus leading to the reduction of product performance. Therefore, it is necessary to add a demagnetizing process after welding, which eventually results in the occurrence of decrease in productivity and increase in manufacturing costs.

In contrast, in a welding current waveform of FIG. 15, a permanent magnet member having been magnetized by a magnetic field that is generated in half cycle immediately after the start of energization is demagnetized by a magnetic field in the opposite direction that is generated in the subsequent half cycle in which polarity is inverted, resulting in the smaller magnetization. However, a polarity is further inverted in the next half cycle, so that a direction of the magnetic field that is generated by the current thereof is inverted, and the magnetization of a permanent magnet member having been made smaller will come to be larger again. Further, since a polarity is inverted in the subsequent half cycle, and a magnetic field of the opposite direction is generated, the permanent magnet member is demagnetized, resulting in smaller magnetization. These magnetization increase/decrease cycles of a permanent magnet member are repeated until the energization is stopped. However, when amplitudes are made smaller by degrees every half cycles, the magnetization of permanent magnet member becomes smaller for each one cycle immediately after the start of energization. As a result, the magnetization of the permanent magnet members will be reduced after the end of welding.

In this welding current waveform, the longer an energization cycle at the attenuation of amplitudes, or the smaller an amplitude just before the end of energization, the smaller a magnetization of permanent magnet members after the end of welding.

As described above, according to the invention of this third embodiment, a welding current is AC. Accordingly, based on the fact that directions of a magnetic field that is generated by a welding current are changed, permanent magnet members, being an object work, are demagnetized even if they have been magnetized temporarily. Consequently, it is possible to make smaller the unnecessary magnetization of permanent magnet members after the end of welding.

Furthermore, due to the fact that a current waveform is such that a polarity of half cycle immediately after the start of energization and a polarity of half cycle just before the end of energization are different, a magnetization direction immediately after the start of energization and a magnetization direction just before the end of energization are opposite, and the polarizations are counteracted. Consequently, the magnetization of permanent magnet members after the end of welding comes to be smaller as compared with the case where polarities are the same.

In addition, a welding current is AC, and is in a current waveform in which amplitudes attenuate with the passage of time. As a result, in the case where metal members including permanent magnet members are welded, a magnetization of the permanent magnet members generated by a welding current after the end of welding becomes smaller. Permanent magnets reach a desired level of magnetization only in the normal polarization process of polarizing the permanent magnet members in necessary intensity and direction without the addition of the demagnetization process after the end of welding to ensure product performance. Consequently, the improvement in productivity and the reduction in manufacturing costs can be achieved.

Further, with reference to FIG. 15, current is carried in 1.5 cycles at the same amplitude, and thereafter the amplitudes are made to attenuate. However, it is desirable that the number of half cycles at the same amplitude is odd number. Accordingly, it is preferable to be 0.5 cycle or 2.5 cycles.

In addition, although an attenuation of amplitudes in each cycle is set to be a certain quantity, it is not limited to this manner of attenuation. Also in the case of changing an attenuation of the amplitudes in each cycle, or in the case of keeping the amplitudes constant at some midpoint of the attenuation process, the same effect may be obtained.

Embodiment 4

FIG. 16 is a chart showing one example of a current waveform of a welding set of metal members including permanent magnet members according to a fourth embodiment. A welding set itself, in the same manner as in the third embodiment, is equipped with an AC generator that generates AC as a welding current, and supplies an AC welding current to a work through the first and second welding electrodes from the AC generator to make the resistance welding. What differs from the third embodiment is a welding current waveform of AC, so that the following descriptions are made with a particular emphasis on differences.

As shown in the drawing, a welding current is AC, and is in a current waveform in which amplitudes come to be larger with the passage of time. A polarity of half cycle immediately after the start of energization is minus, and thereafter amplitudes become larger by degrees while inverting polarities. Although FIG. 14 shows the case where the number of half cycles in which amplitudes become the maximum is three, it is not limited to three, and it may be any other odd number. Furthermore, a polarity of the first half cycle in which amplitude comes to be the maximum is set to be a polarity opposite to that of half cycle immediately after the start of energization. In the case of the drawing, a polarity immediately after the start of energization is minus, so that a polarity of the fist half cycle in which amplitude becomes the maximum is plus. Further, a polarity of half cycle just before the end of energization is made to be different from that of half cycle immediately after the start of energization.

Problems in the case of welding metal members including permanent magnet members in the conventional welding current waveform of DC are as described in the foregoing third embodiment. In contrast, in a welding current waveform according to this fourth embodiment, a permanent magnet member having been magnetized by the magnetic field that is generated of half cycle immediately after the start of energization is demagnetized by a more intense magnetic field in an opposite direction that is generated in the subsequent half cycle of a larger amplitude. However, a polarity in the further subsequent cycle is inverted, so that a direction of the magnetic field that is generated by a current thereof is inverted, and a magnetization of the permanent magnet member having been made smaller comes to be larger again. These magnetization increase/decrease cycles of a permanent magnet member are repeated until the increase of amplitudes is ended. To effectively demagnetize a permanent magnet member having been magnetized, a more intense magnetic field in a direction opposite to that at the time of magnetization is needed. By generating a more intense magnetic field due to the increase of amplitudes, a magnetization of the permanent magnet members after the end of energization comes to be smaller.

In a welding current waveform according to the invention, in the case where a polarity of half cycle immediately after the start of energization and a polarity of half cycle in which an amplitude becomes the maximum, the increase of amplitudes ends in a cycle in which a permanent magnet member is demagnetized in a magnetic field in an opposite direction. Thus, a magnetization of the permanent magnet member after the end of welding comes to be smaller as compared with the case where these polarities are the same. Furthermore, in the case where the number of half cycles in which amplitudes thereof becomes the maximum is odd number, the number of plus half cycles and the number of minus half cycles in which amplitudes are maximal after the increase of amplitudes has ended in a cycle of demagnetization by an opposite directional magnetic field become equal. Accordingly, due to the fact that energization ends in a cycle in which a permanent magnet member is demagnetized by an opposite directional magnetic field, a magnetization of the permanent magnet member after the end of welding comes to be smaller as compared with the case where the number of half cycles in which amplitudes are maximal.

Furthermore, in the case where a polarity of half cycle immediately after the start of energization and a polarity of half cycle just before the end of energization are different, the energization is ended in a cycle in which a permanent magnet member is demagnetized by the opposite directional magnetic field. Accordingly, a magnetization of the permanent magnet member after the end of welding comes to be smaller as compared with the case where these polarities are the same.

As described above, according to the invention of this fourth embodiment, a welding current is AC, and is in a waveform of which amplitudes rise with the passage of time. As a result, in the case where metal members including permanent magnet members are welded in this waveform, a magnetization of the permanent magnet members generated by a welding current after the end of welding becomes smaller. Permanent magnets reach a desired level of magnetization only in the normal polarization process without addition of any demagnetization process after the end of welding to ensure product performance. Consequently, the improvement in productivity and the reduction in manufacturing costs can be achieved.

Furthermore, a polarity of half cycle immediately after the start of energization and a polarity of half cycle of the amplitude coming to be the maximum are different. As a result, since the increase of amplitudes ends in a cycle of the permanent magnet members being demagnetized by the opposite directional magnetic field, a magnetization of the permanent magnet members generated by a welding current may be decreased further.

In addition, the number of waves of half cycle in which the amplitude is maximal is odd number. As a result, the polarization of half cycle immediately after the start of energization is counteracted by the polarization of the first half cycle in which a strength of a magnetic field becomes the maximum, and thereafter the maximum magnetic fields that will be generated afterwards are counteracted by the magnetic fields of the same number of half cycles of which directions are different. Consequently, a smaller magnetization of permanent magnet members after the end of welding is achieved as compared with the case of even number.

It is preferable either that amplitudes are increased at a constant rate in each cycle or that they are increased while changing the rates. Also in the case of keeping amplitudes constant at some midway of the attenuation process, the same effect may be obtained. Furthermore, although in a welding current waveform according to this fourth embodiment, a polarity immediately after the start of energization is minus, the same effect may be obtained in the case of being plus.

Embodiment 5

FIG. 17 is a chart showing one example of a current waveform of a welding set according to a fifth embodiment of the invention. A welding set itself, as in the third embodiment, is equipped with an AC generator that generates AC as a welding current, and supplies an AC welding current to a work through the first and second welding electrodes from the AC generator to make the resistance welding. What differs from the third embodiment is an AC welding current waveform, so that the descriptions are made with a particular emphasis on differences.

As shown in the drawing, a welding current waveform is AC; and amplitudes come to be larger with the passage of time, and an amplitude of the second half cycle, being counted immediately after the start of energization, becomes the maximum. An energization cycle is one cycle, a polarity of half cycle immediately after the start of energization is minus, and a polarity of the subsequent half cycle is plus. Furthermore, an amplitude I1 of half cycle immediately after the start of energization is in a range of ⅓ to ⅔ an amplitude I2 of the subsequent half cycle.

Problems in the case of welding metal members including permanent magnet members according to the conventional DC welding current waveform are as described in the foregoing third embodiment. In contrast, in a welding current waveform according to this fifth embodiment, permanent magnet members having been magnetized by the magnetic field that is generated in half cycle immediately after the start of energization is demagnetized by a more intense magnetic field in an opposite direction which magnetic field is generated in the subsequent half cycle of a larger amplitude. In this welding current waveform, a welding current is carried only in the minimum time period, so that a magnetization of a permanent magnet member after the end of welding comes to be smaller as compared with the case of longer energization cycles at the time of an amplitude being maximal.

Now, the reason why the ratio between an amplitude of half cycle immediately after the start of energization and an amplitude of the subsequent half cycle is set as described above, will be described.

FIG. 18 is a chart showing one example of the relation between amplitude ratios of a welding current and magnetization levels. This chart shows the relation of a magnetization level (a rate of magnetization after the end of welding to a full magnetization) relative to a ratio between the amplitude I1 of half cycle immediately after the start of energization and the amplitude I2 of the subsequent half cycle. As shown in the chart, magnetization levels come to be an extremely small value in the vicinity of an amplitude ratio being ½, and come to be very small values, being approximately 2% in a range of ⅓ to ⅔. Therefore, it is understood to be significantly effective that an amplitude of half cycle immediately after the start of energization is in a range of ⅓ to ⅔ an amplitude of the second half cycle, being counted immediately after the start of energization.

FIG. 19 is a modified chart of a welding current waveform of FIG. 17. In this regard, a waveform of a welding current is basically the combination of a current waveform that rises with the passage of time and a current waveform that attenuates with the passage of time. That is, this welding current is AC, and in a current waveform of which amplitudes rise temporarily and thereafter attenuate with the passage of time.

On the supposition that current is in a waveform in which a range where an amplitude rises with the passage of time is as shown in FIG. 17 and that thereafter amplitudes attenuate by degrees, the above-mentioned effect can be obtained in a range of the rise process. Further, due to the fact that a magnetization of permanent magnet members having been slightly magnetized is gradually becomes smaller as a welding current is decayed, a magnetization of the permanent magnet members after the end of welding becomes smaller as compared with the case of no addition of attenuated waveform.

In addition, although amplitudes start to attenuate shortly after the rise of amplitude in FIG. 19, the same effect can be obtained even in the case of plural numbers of half cycles in which amplitudes are maximal (it is preferable to be odd number), and the invention according to this fifth embodiment is not limited to the case of the drawing.

Further, although in both FIG. 17 and FIG. 19, a polarity immediately after the start of energization is minus, the same effect can be obtained even if the energization is started in a plus polarity.

As describe above, according to the invention of this fifth embodiment, the welding is made in a current waveform in which an amplitude of the second half cycle, being counted immediately after the start of energization of a welding current, is the maximum. As a result, a time period in which a welding current is carried is set to be the minimum, thus enabling to efficiently achieve a smaller magnetization of permanent magnet members after the end of welding.

Further, an amplitude of half cycle immediately after the start of energization is in a range of ⅓ to ⅔ an amplitude of the second half cycle, being counted immediately after the start of energization. As a result, permanent magnet members having been magnetized in half cycle immediately after the start of energization can be efficiently demagnetized in the subsequent half cycle, thereby enabling to efficiently achieve a smaller magnetization of permanent magnet members after the end of welding. Thus, it is possible to cause permanent magnet members to reach a desired level of magnetization only in the normal polarization process without addition of the demagnetization process after the end of welding to ensure product performance. Consequently, the improvement in productivity and the reduction in manufacturing costs can be achieved.

Furthermore, in the arrangement in which welding current waveform amplitudes rise temporarily and thereafter attenuate with the passage of time, a smaller magnetization of the permanent magnet members after the end of welding as compared with the case of no addition of attenuated waveform.

Embodiment 6

FIG. 20 is a chart showing one example of a current waveform of a welding set according to a sixth embodiment of the invention. A welding set itself, as in the third embodiment, is equipped with an AC generator that generates AC as a welding current, and supplies an AC welding current to a work through the first and second welding electrodes from the AC generator to make the resistance welding. What differs from the foregoing third embodiment is an AC welding current waveform, so that the descriptions are made with a particular emphasis on differences.

As shown in the drawing, a welding current waveform is AC, which is in a current waveform in which peak current values of the welding current continue during a predetermined time period, and a polarity of half cycle immediately after the start of energization and a polarity of half cycle just before the end of energization are different. Although the chart indicates a waveform in which peak currents continue during a predetermined time period in every cycle, at least a peak current value of half cycle in which the amplitude of a welding current is maximal has only to continue during a predetermined time period. Further, although the chart shows a current waveform in which amplitudes rise temporarily and thereafter attenuate, it is preferable to be a current waveform of only rise, or of only attenuation. Moreover, as in the heretofore embodiments, it is preferable that a polarity immediately after the state of energization is minus or plus.

Now, operations are described. In welding current waveforms as descried in the foregoing embodiments, since any peak current is not held, there is no effective means but to cause a peak current value to be higher in order to obtain a large resistance heat generation. However, in case of projection welding, on the supposition of causing a peak current value to be higher for the purpose of obtaining higher welding intensity, there are some cases where a projection, which is formed at the weld area of one member of a work, is melt and scattered due to abrupt heat generation, resulting in a lower weld intensity after all. In particular, in an AC welding current waveform, a projection repeats the expansion and contraction due to the repeated heat generation and cooling, and tends to be scattered. In contrast, in a welding current waveform according to this sixth embodiment, peak currents are held during a predetermined time period, and a large heating value can be maintained for a long time period, thereby enabling to obtain a higher weld intensity with a lower peak current than in the case of not holding a peak current.

As described above, according to the invention of this sixth embodiment, a welding current is in a waveform in which at least a peak current value of half cycle of an amplitude being maximal continues for a predetermined time period. As a result, since a large heating value can be kept for a long time period, higher weld intensity may be obtained with a lower peak current. Furthermore, lower peak currents provide a gradual heat generation, and the projections are less likely to scatter, thus enabling to obtain constant weld strength. Moreover, based on the fact that a magnetization of permanent magnet members is determined with peak currents, a smaller magnetization of the permanent magnet members after the end of welding is achieved.

Embodiment 7

Now, a welding set of metal members including permanent magnet members according to a seventh embodiment is described. A welding set itself, as in the foregoing third embodiment, is equipped with an AC generator that generates AC as a welding current, and supplies an AC welding current to a work through the first welding electrode and the second welding electrode from the AC generator to make the resistance welding. The invention according to this seventh embodiment is characterized in configuration of a weld area of a work.

FIG. 21 is a cross sectional view of a projection of the weld area of a work. To make the description of a rotor as an example of works, as shown in the drawing, a projection is formed of a hemispherical projection 41a and a groove 41 around this projection at the weld areas of a cooling fan 41. By causing this projection 41a to abut on a welded face of a pole core 42 to carry current, the welding is made.

For example, in the case of welding a cooling fan 41 to a pole core 42 of rotors of an electric rotating machine, a plurality of projections are formed at the cooling fan 41, and the welding is made at plural points so that cooling fan 41 may be resistant to the centrifugal force at the time of rotation. In the case, however, where a plurality of points are welded simultaneously, there may occur the cases where the welding at a part of weld points is outside the appropriate welding conditions depending on a directional relation with a welding transformer, or due to the fluctuations in projection configuration, the fluctuations in applied pressure of the welding electrodes, or the like. When not satisfying the appropriate welding conditions, for example, there may occur such a trouble that a projection 41a is scattered due to the excessive expansion, and a temperature at a weld area will not reach a predetermined temperature, so that sufficient weld intensity cannot be obtained. Particularly, in an AC welding current waveform, projections repeat the expansion and contraction to be likely to scatter owing to the repeated heat generation and cooling.

In contrast, in the case where the grooves 41b are formed around the projections 41a, even when apart of a plurality of weld points are outside the appropriate welding conditions, the projections 41a that may be scattered get in the grooves 41b formed therearound to stay in the vicinity of the weld areas. Further, temperatures of the cooling fan 41 and the pole core 42 rises to be enough high to achieve the welding, making it possible to obtain a sufficiently high weld intensity at all the plurality of weld points.

Furthermore, although projections are hemispherical in this seventh embodiment, the same effect can be obtained even in truncated-conical configuration or V-shape in cross section. Moreover, a cross sectional shape of the groove is not limited to that in this seventh embodiment, and it has only to be such a cross sectional shape as projections that may be scattered can enter.

As described above, according to the invention of this seventh embodiment, there are formed a projection and a groove around this projection in a welded face of either member of a work consisting of a metal member including a permanent magnet member and another metal member, and the welding is made by causing this projection to abut on a welded face of the other member to carry current. As a result, even if a part of a plurality of weld points are outside the appropriate welding conditions and projections will be scattered, the temperature rise necessary for welding can be achieved with the help of grooves, and stable weld areas may be obtained, resulting in higher reliability.

Furthermore, in the inventions according to the third to seventh embodiments heretofore described, on the supposition of a welding set constructed such that the first welding electrode and the second welding electrode are located on one end side of a work with respect to one metal member and the other metal member respectively, as well as are located so that there is no permanent magnet member between respective abutment terminals of one metal member and other metal member, a path of a welding current is made to be away from the permanent magnet members, thus enabling to suppress the magnetization of the permanent magnet members. In addition, effects of the devised current waveforms described in the third to seventh embodiments can be achieved, thus enabling to efficiently make a magnetization of permanent magnet members smaller.

Further, in the inventions according to the third to seventh embodiments, in the case where the welding is made simultaneously at a plurality of weld areas using the first welding electrode and the second welding electrode, operation efficiency is enhanced, resulting in the improvement in productivity.

Furthermore, in the inventions according to the third to seventh embodiments, in the case of taking rotors of an electric rotating machine as object works, a magnetization of permanent magnet members after the end of welding comes to be smaller. Accordingly, permanent magnet members reach a desired level of magnetization only in the normal polarization process without addition of the demagnetization process after the end of welding to ensure performance of an electric rotating machine. Consequently, the improvement in productivity of an electric rotating machine and the reduction in manufacturing costs can be achieved. In addition, a quality of the weld areas of a cooling fan is improved, so that higher reliability of an electric rotating machine is achieved.

INDUSTRIAL APPLICABILITY

The invention is widely applicable to a welding set that welds a metal member to another metal member including permanent magnet members, and a welding method thereof.

BRIEF DESCRIPTION OF DRAWINGS

FIG. 4 is a diagram showing one example of an electric circuit of the welding set of FIG. 1.

FIG. 5 is a chart showing a voltage waveform provided by a switching circuit of the electric circuit of FIG. 4.

DESCRIPTION OF REFERENCE NUMERALS

Figure 1:
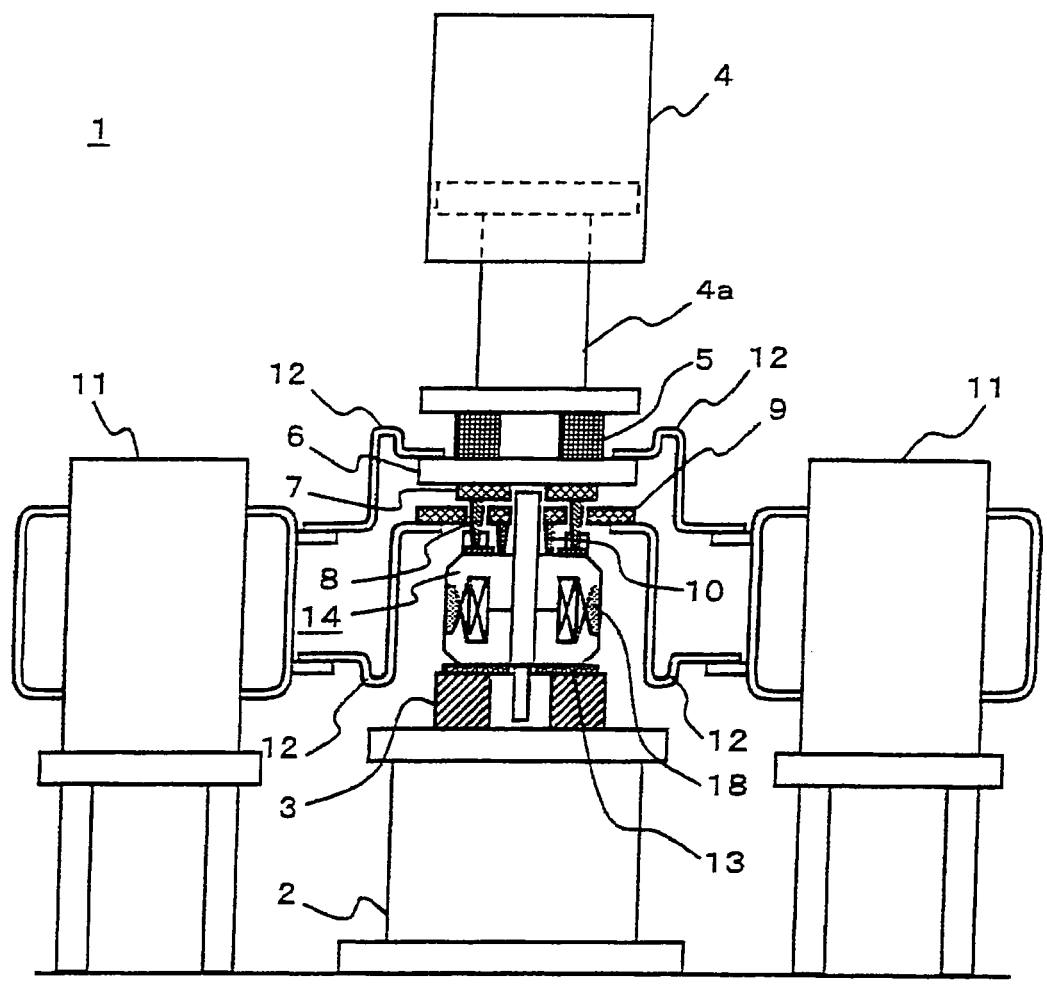
FIG. 1 is a schematic view of a welding set of metal members including permanent magnet members according to a first preferred embodiment of the present invention.
Figure 2:
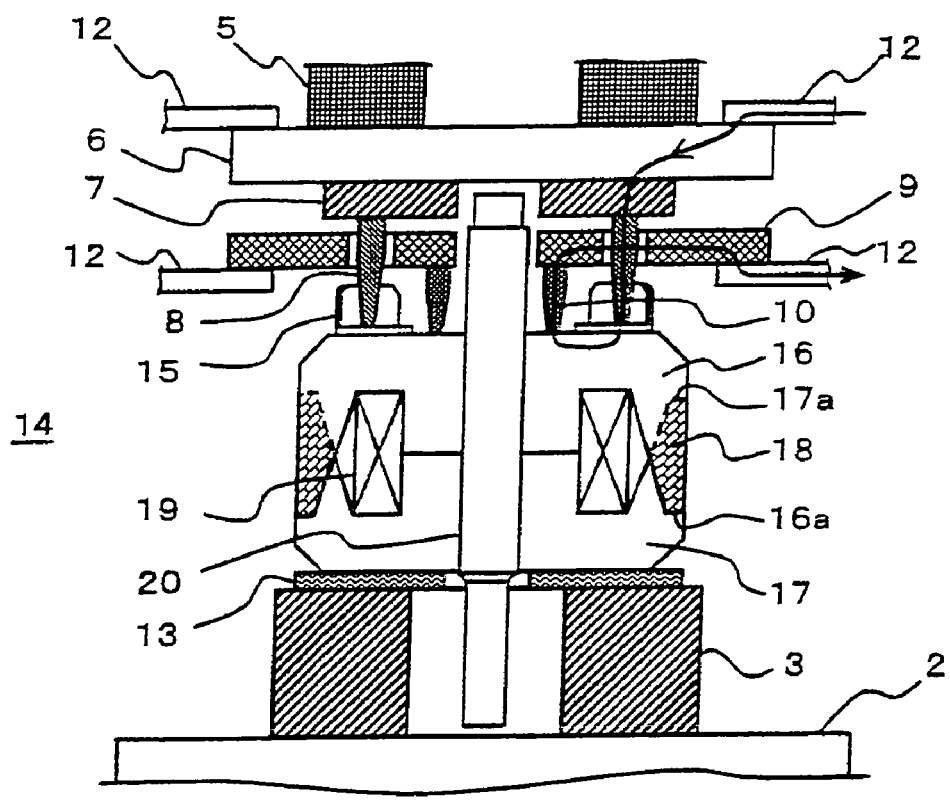
FIG. 2 is a partially cross sectional view of a work and its vicinity.
Figure 3:
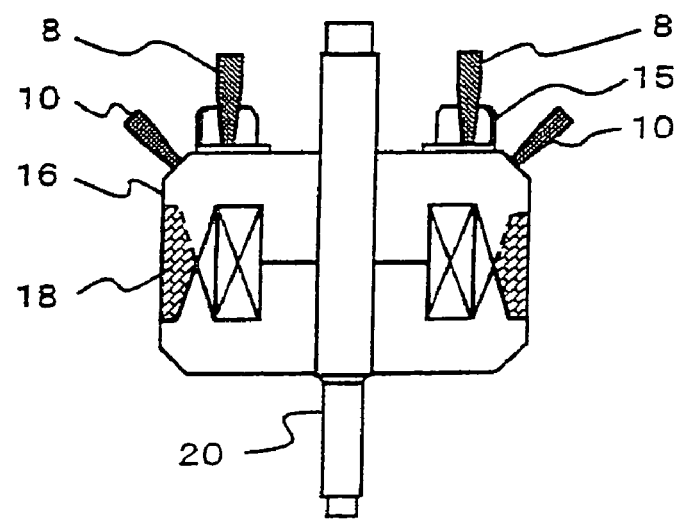
FIG. 3 is a view showing one example of causing welding electrodes to abut on a work in the welding set of FIG. 1.
Figure 6:
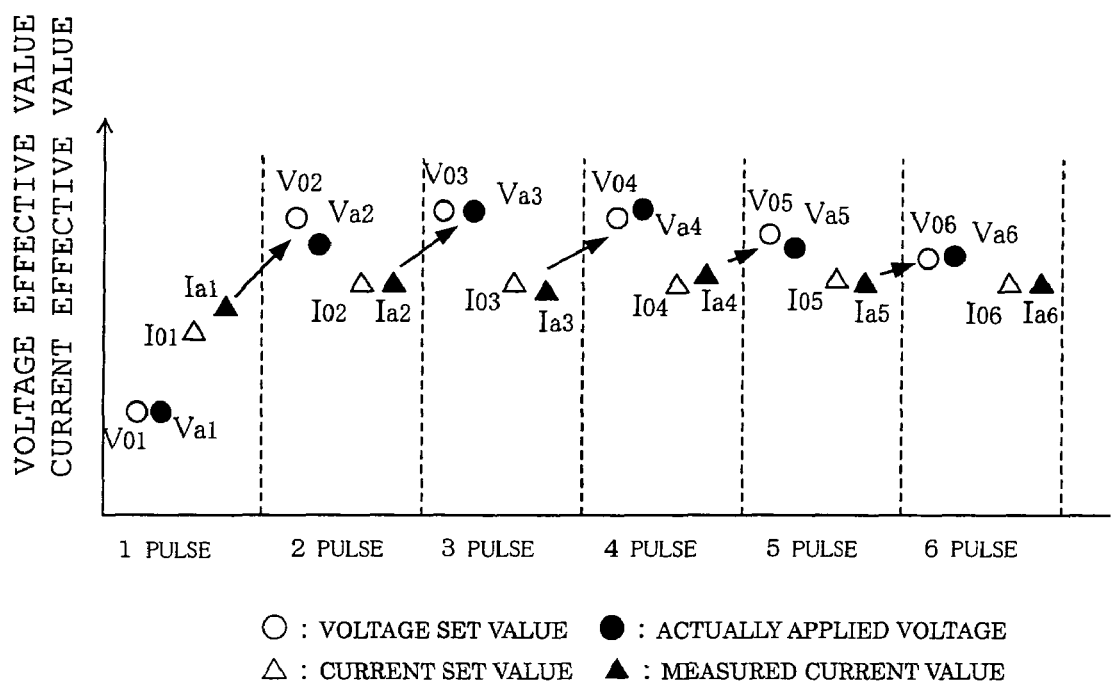
FIG. 6 is a chart showing a control image of a welding current of the electric circuit of FIG. 4.
Figure 7:
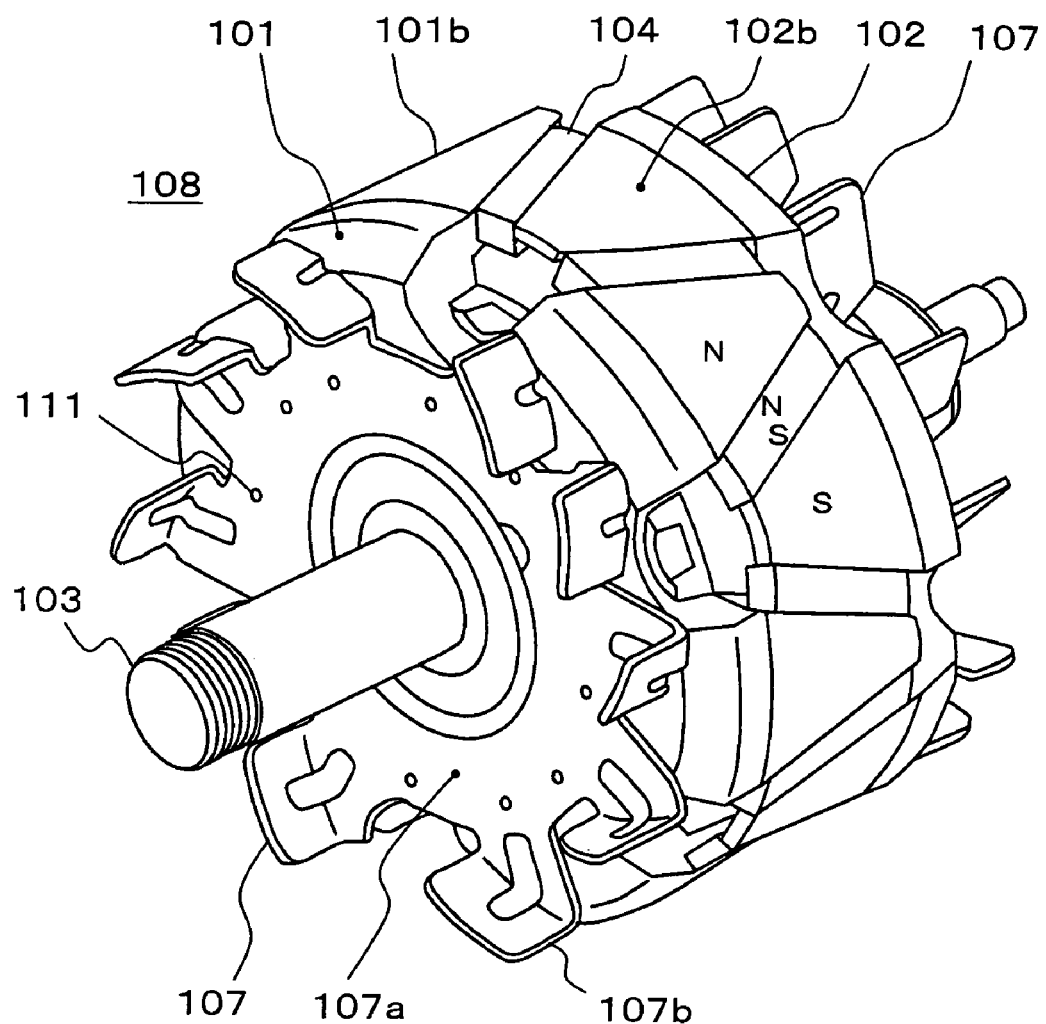
FIG. 7 is a perspective view showing a rotor of electric rotating machines, being an object work of the welding set of metal members including permanent magnet members, according to a second embodiment of the invention.
Figure 8:
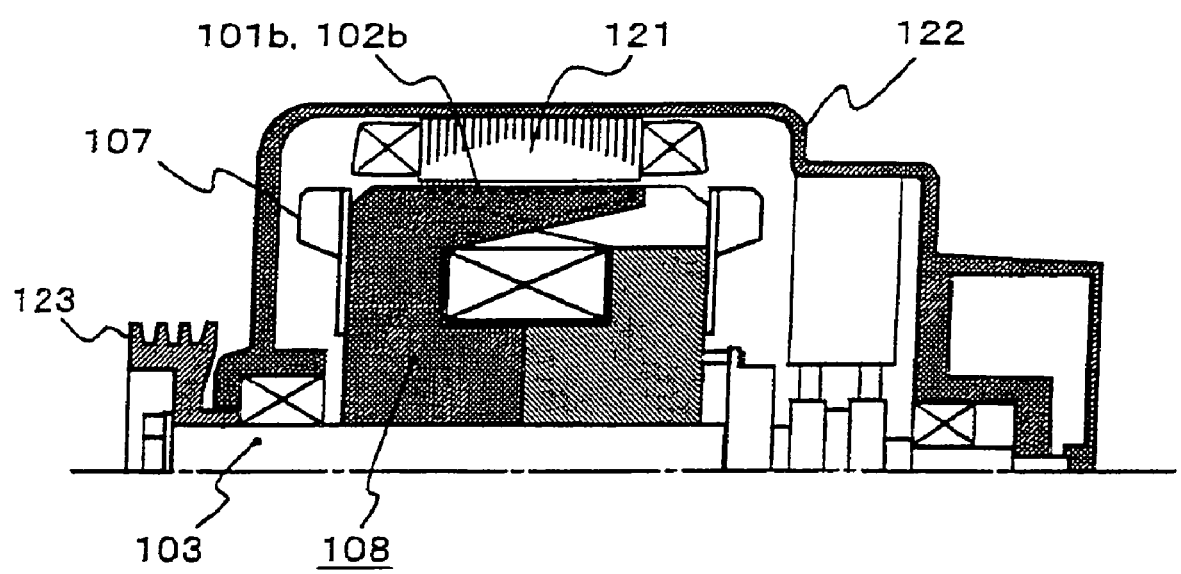
FIG. 8 is a cross sectional view showing an upper half of an electric rotating machine in which the rotor of FIG. 7 is incorporated.
Figure 9:
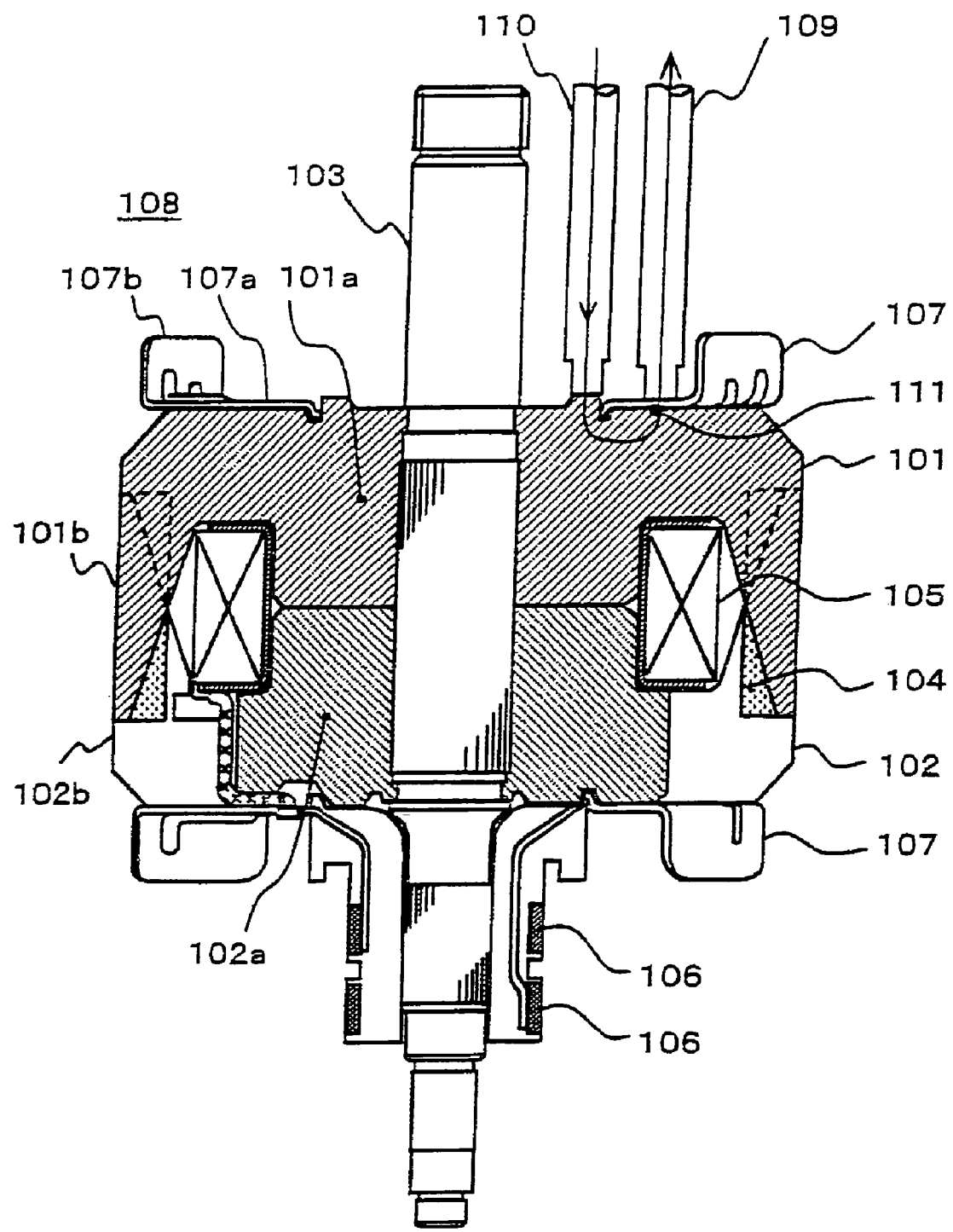
FIG. 9 is a side cross sectional view of FIG. 7.
Figure 10:
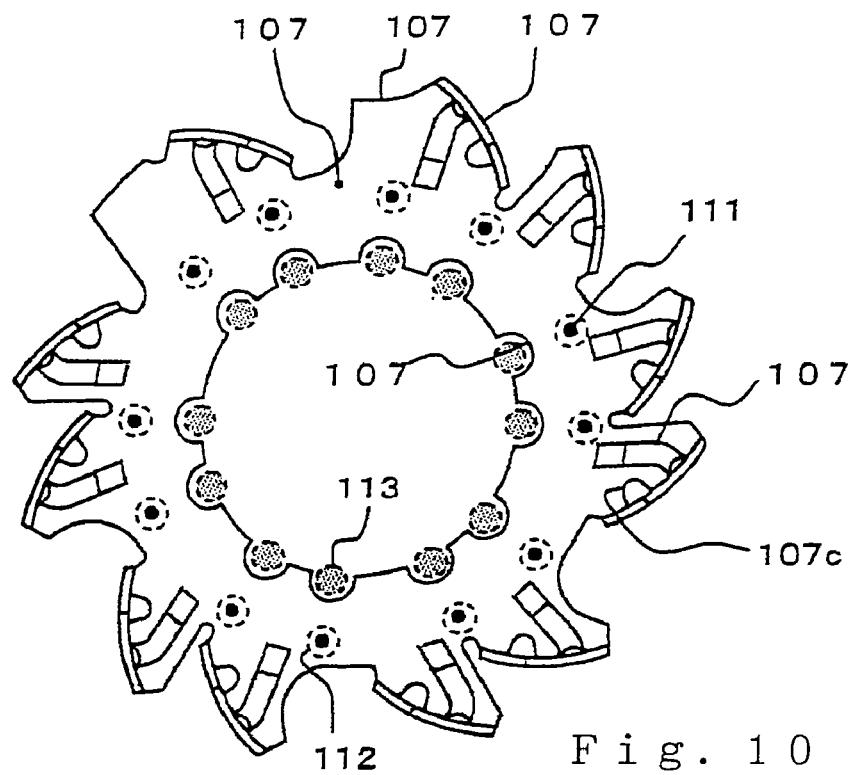
FIG. 10 is a view showing one example of a cooling fan of the rotor of FIG. 7.
Figure 11:
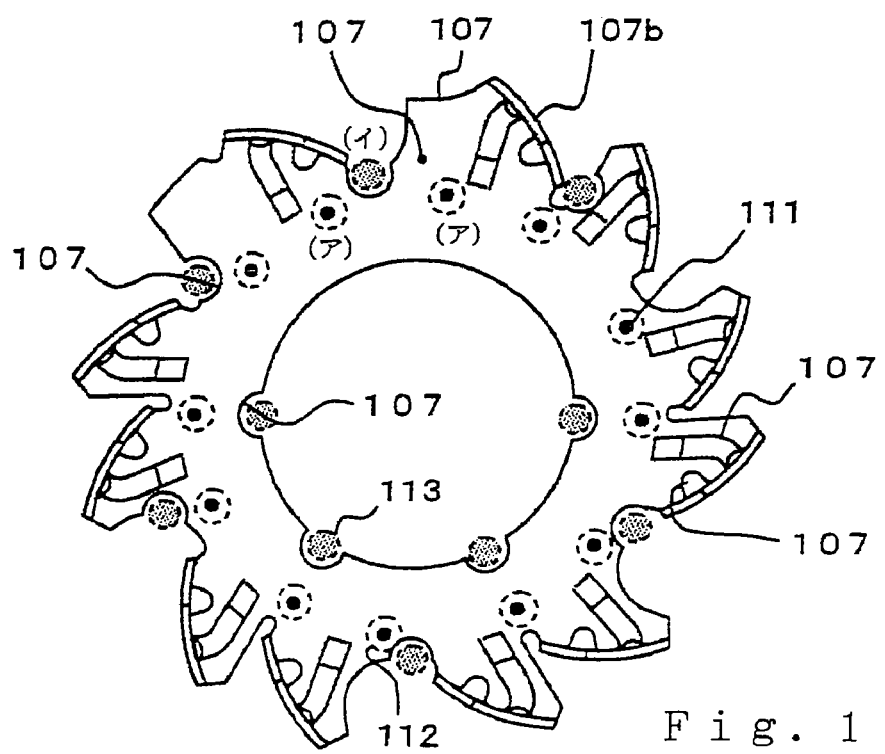
FIG. 11 is a view showing another example of a cooling fan of the rotor of FIG. 7.
Figure 12:
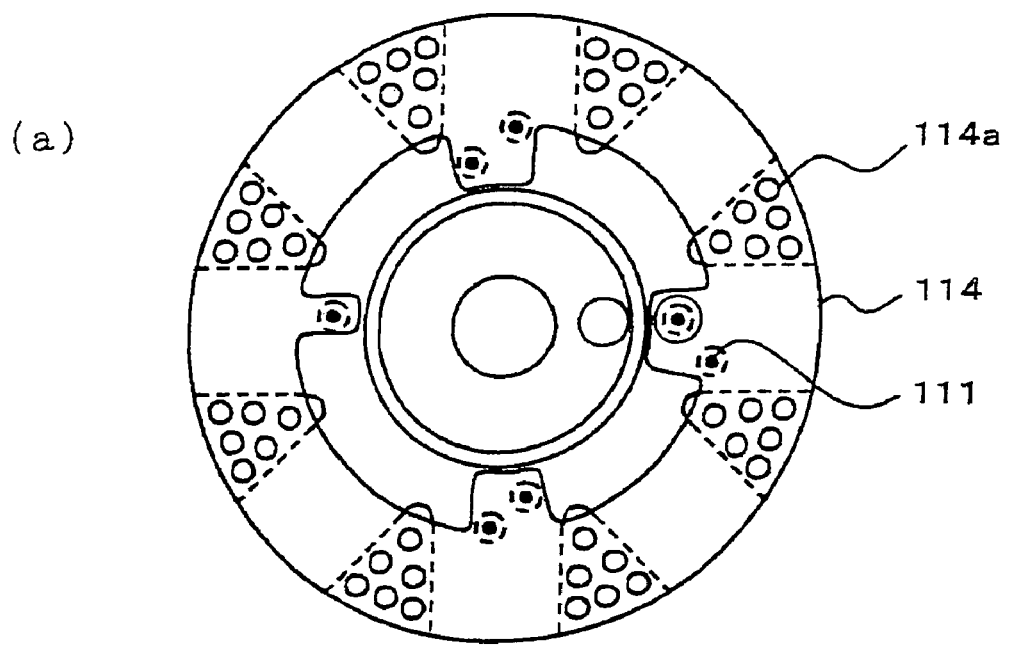
FIG. 12 are views showing a foreign substance barrier plate to be applied to the rotor of FIG. 7.
Figure 12:
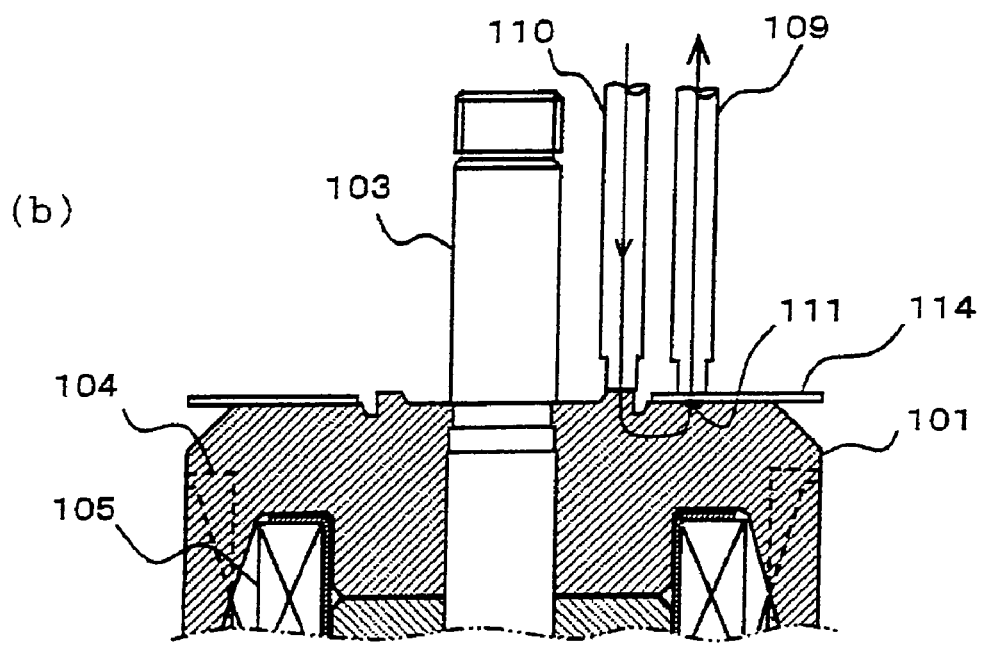
Figure 13:
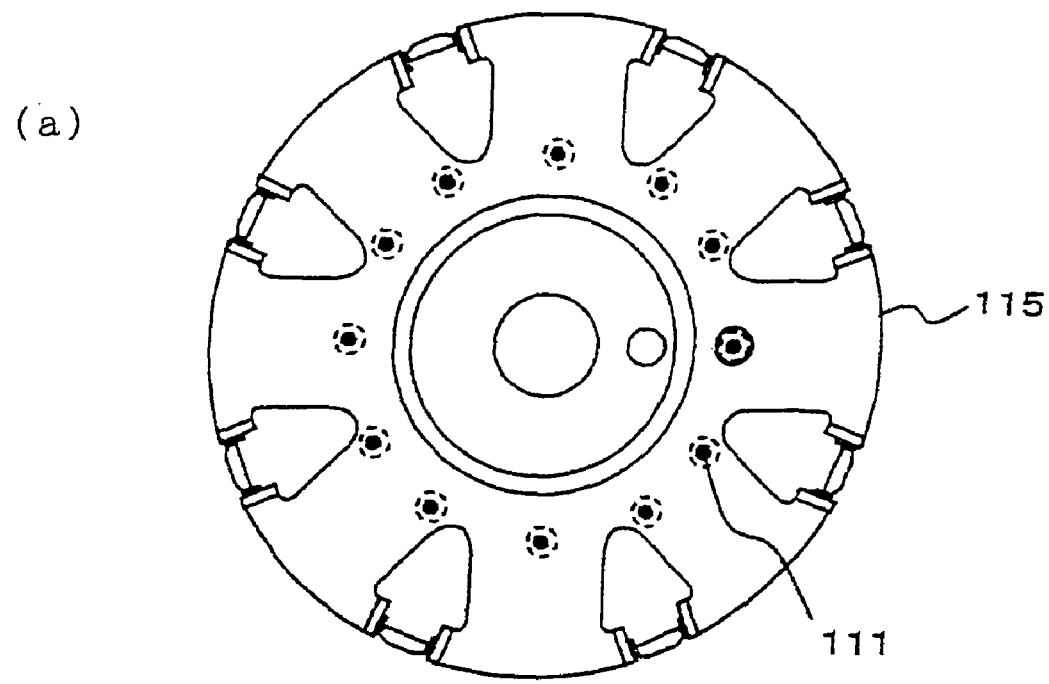
FIG. 13 are views showing a magnet falling prevention plate to be applied to the rotor of FIG. 7.
Figure 13:
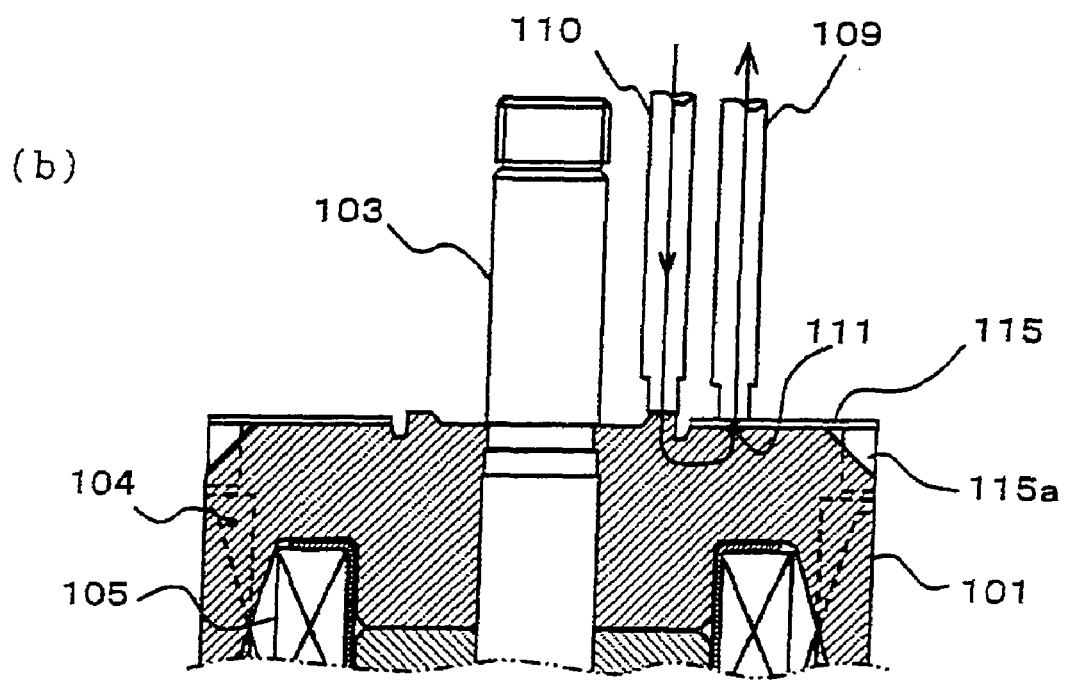
Figure 14:
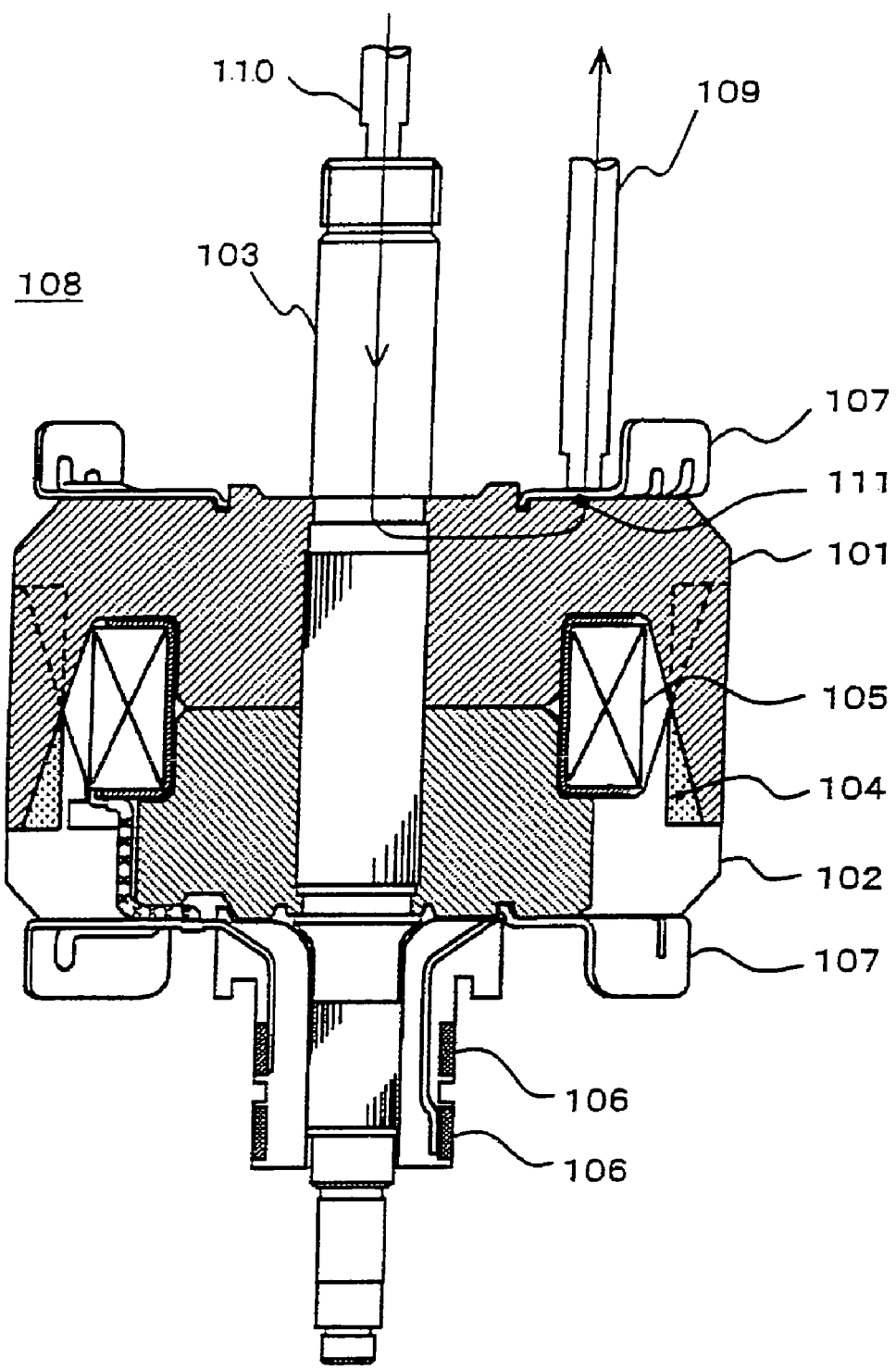
FIG. 14 is a view showing one example of causing welding electrodes to abut on a work of the welding set according to the second embodiment.
Figure 15:
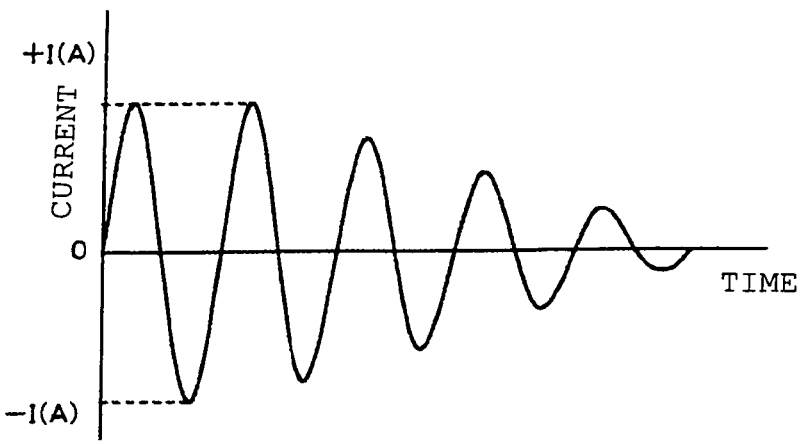
FIG. 15 is a chart showing a welding current waveform of the welding set of metal members including permanent magnet members according to a third embodiment of the invention.
Figure 16:
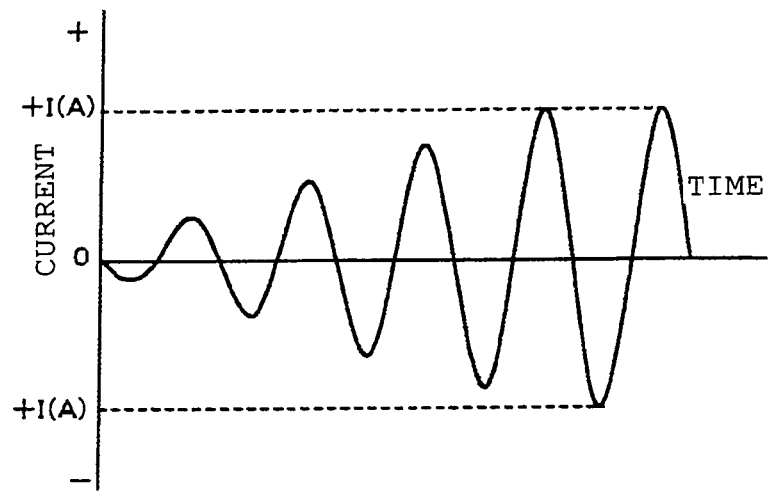
FIG. 16 is a chart showing a welding current waveform of the welding set of metal members including permanent magnet members according to a fourth embodiment of the invention.
Figure 17:
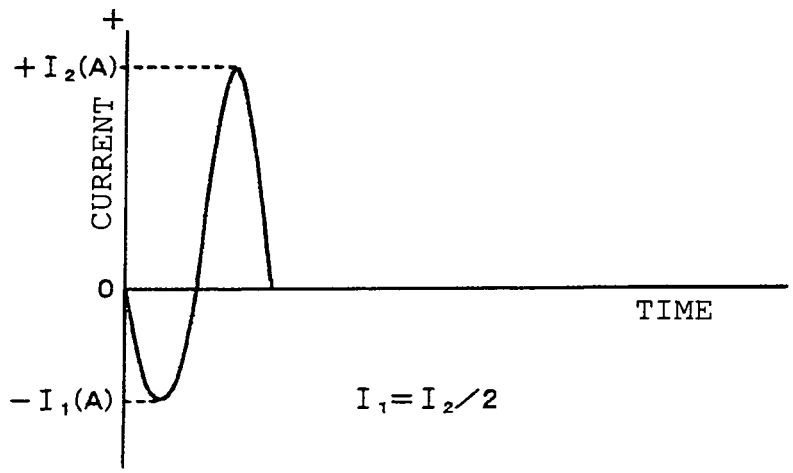
FIG. 17 is a chart showing a welding current waveform of the weld set of metal members including permanent magnet members according to a fifth embodiment of the invention.
Figure 18:
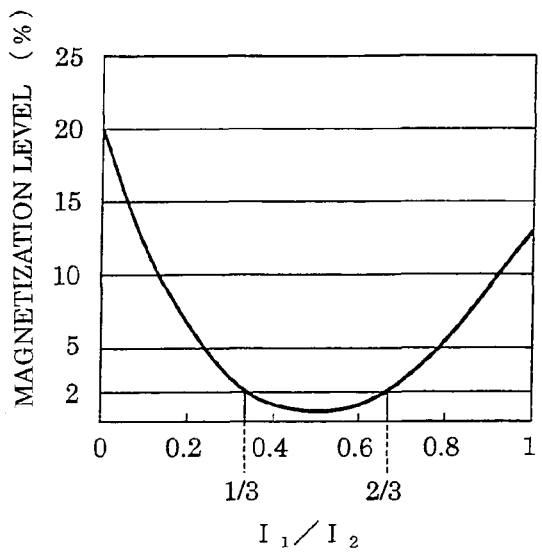
FIG. 18 is a chart showing on example of the relation between amplitude ratios of a welding current and magnetization levels of the welding set according to the fifth embodiment.
Figure 19:
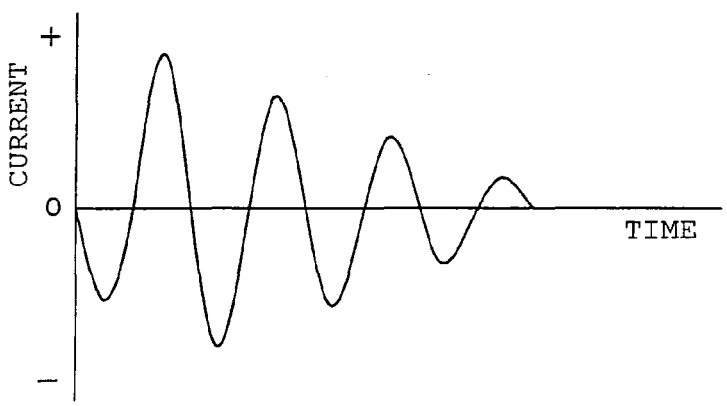
FIG. 19 is a chart showing the other example of a welding current waveform of the weld set of metal members including permanent magnet members according to the fifth embodiment of the invention.
Figure 20:
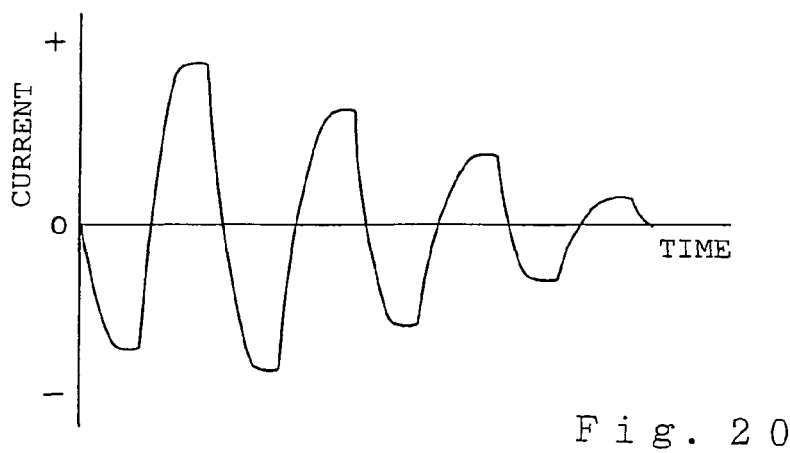
FIG. 20 is a chart showing a welding current waveform of the welding set of metal members including permanent magnet members according to a sixth embodiment of the invention.
Figure 21:
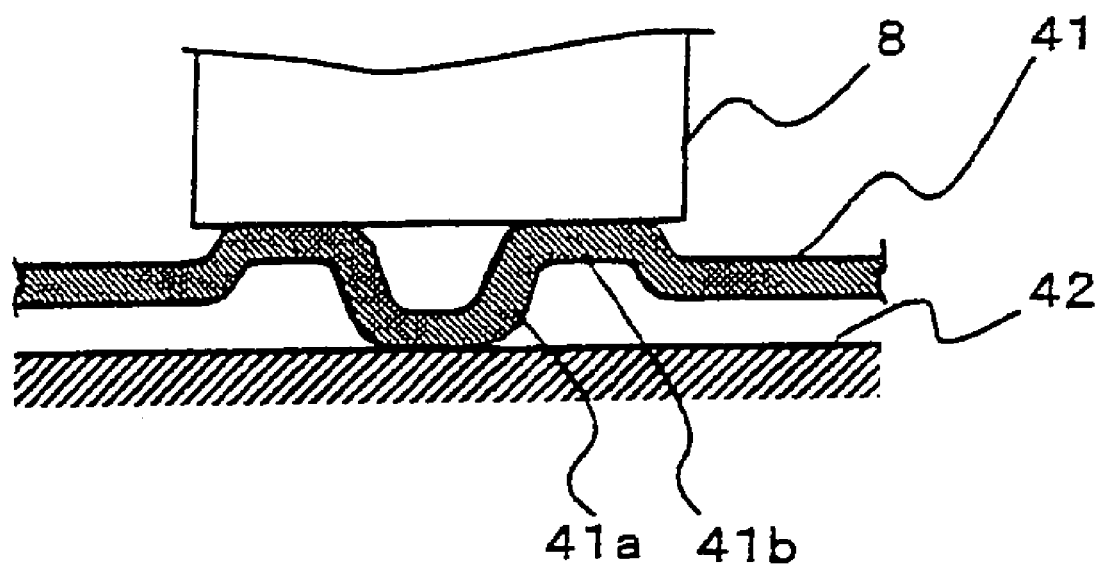
FIG. 21 is a view showing a configuration of a weld area of an object work of the welding set of metal members including permanent magnet members according to a seventh embodiment of the invention.

1: welding set, 3: work retaining part
4: pressure device, 5: elastic member
8: first welding electrode, 10: second welding electrode
11: welding transformer, 13: insulating member
14: work, 15: cooling fan
16, 17: pole cores, 18: permanent magnet member
21: switch, 22: rectifier circuit
23: capacitor, 24: switching circuit
25: welding transformer, 28: input·display unit
29: current sensor, 32: control circuit
41: cooling fan, 41a: projection
41b: groove, 42: pole core
101, 102: pole cores, 101b, 102b: pawl-shaped magnetic poles
103: shaft, 104: permanent magnet member
105: field coil, 107: cooling fan
107d: notch. 108: rotor
109: first welding electrode, 110: second welding electrode
114: foreign substance barrier plate, 115: magnet falling prevention plate
121: stator, 122: bracket

The invention claimed is:

1. A welding set of a first metal member comprising:
a permanent magnet member;
a second metal member of a work;
a work retaining part that retains said work;
a pressure device that is located above said work retaining part with a work-providing space interposed;
a first welding electrode that is mounted on a moving part side of said pressure device, and is made to abut on said work;
a second welding electrode made to abut on said work; and
a plurality of welding transformers including a first welding transformer supplying a welding current to said first and second welding electrodes;
wherein said first and second welding electrodes are located on one end side of said work with respect to said first metal member and said second metal member respectively, and are located so that no said permanent magnets are interposed between respective abutment terminals of said first metal member and said second metal member,
wherein said plurality of welding transformers are connected to a plurality of first welding electrodes including the first welding electrode and a plurality of second welding electrodes including the second welding electrode, wherein the plurality of first electrodes are different from the plurality of second electrodes, and wherein said plurality of welding transformers are electrically connected in parallel, and plural weld areas are simultaneously welded with the use of said plurality of first welding electrodes and said plurality of second welding electrodes, and
wherein the first welding electrodes and the second welding electrodes are driven independent from one another by different mechanisms.

2. The welding set according to claim 1, wherein said work retaining part and said work are electrically insulated from each other through an insulating member.

3. The welding set according to claim 1, wherein at least either of said first welding electrode or said second welding electrode is arranged to oscillate by being in contact with the work.

4. The welding set according to claim 1, further comprising an electric circuit making it possible to set a current value and a duration thereof, and a polarity of said welding current.

5. The welding set according to claim 4, wherein said electric circuit comprises: a capacitor in which an electric power is charged and stored; a switching circuit that converts a discharge current from said capacitor into an alternating current to supply said alternating current to said welding transformer; a control circuit that controls said switching circuit; an input section that sets a set value for obtaining a predetermined current waveform to said control circuit; and a current sensor that monitors an output current from said switching circuit, and
wherein a welding current is controlled while comparing said output current and said set value.

6. The welding set according to claim 1, wherein said work is a rotor of an electric rotating machine.

7. A resistance welding method using a welding set comprising a first metal member including a permanent magnet member; a second metal member of a work; a work retaining part that retains said work; a pressure device located above said work retaining part with a work-providing space interposed; a first welding electrode that is mounted on a moving part side of said pressure device; a second welding electrode that is moved independently from the first welding electrode; and a first welding transformer, wherein the welding method comprises:
abutting the first welding electrode and the second welding electrode on said work, said abutting comprising arranging the first and second welding electrodes on one end side of said work with respect to said first metal member and said second metal member respectively so that no said permanent magnet member are interposed between respective abutment terminals of said first metal member and said second metal member; and
supplying a welding current to said work from said first and second welding electrodes to perform resistance welding.

8. The welding set according to claim 1, wherein the plurality of welding transformers further comprises a second welding transformer, and wherein the first welding transformer and the second welding transformer are on opposite sides of the work retaining part.

9. The welding method according to claim 7, wherein the welding set further comprises a plurality of welding transformers including the first welding transformer, said plurality of welding transformers being connected to a plurality of first welding electrodes including the first welding electrode and a plurality of second welding electrodes including the second welding electrode, wherein said plurality of welding transformers are electrically connected in parallel, and wherein the method further comprises simultaneously welding plural weld areas using said plurality of first welding electrodes and said plurality of second welding electrodes.

10. The welding method according to claim 9, further comprising arranging the first welding transformer and a second welding transformer among the plurality of welding transformers on opposite sides of the work retaining part.

11. The welding method according to claim 7, further comprising oscillating at least one of said first and second welding electrodes which is in contact with said work.

12. The welding set according to claim 1, wherein the first welding electrode and another second electrode from the plurality of second welding electrodes abuts the first metal member and another first electrode from the plurality of first welding electrodes and the second welding electrode abut the second metal member and wherein the plurality of first welding electrodes and the plurality of second electrodes are controlled by different moving mechanisms.

13. The welding set according to claim 1, wherein the plurality of first electrodes are attached to a first welding holder and the plurality of second electrodes disposed in the vicinity of the plurality of first electrodes and are attached to a second welding holder, and wherein the first welding holder is driven by a first moving mechanism comprising the moving part side of said pressure device and the second welding holder is driven by a different second moving mechanism attached to a supporting member.

14. The welding set according to claim 1, wherein the first welding electrode is not parallel to the second welding electrode.

15. The welding set according to claim 1, wherein no permanent magnets are interposed between respect abutment terminals with respect to a cooling fan and a pole core such that when the first welding electrode abuts the cooling fan and the second welding electrode abuts the pole core, no permanent magnets are interposed therein between.

16. The welding set according to claim 1, wherein the first welding electrode and the second welding electrode are located on one side of the work with respect to a pole core and a cooling fan, respectively.

17. The welding set according to claim 1, wherein the first welding electrode is positioned at an acute or obtuse angle with respect to the second welding electrode.

* * * * *